(12) United States Patent
Elshafie et al.

(10) Patent No.: US 12,484,082 B2
(45) Date of Patent: Nov. 25, 2025

(54) CONSIDERATIONS ON CHANNEL SENSING FOR SIDELINK

(71) Applicant: QUALCOMM Incorporated, San Diego, CA (US)

(72) Inventors: Ahmed Elshafie, San Diego, CA (US); Seyedkianoush Hosseini, San Diego, CA (US); Wei Yang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 511 days.

(21) Appl. No.: 17/961,549

(22) Filed: Oct. 6, 2022

(65) Prior Publication Data

US 2024/0121812 A1    Apr. 11, 2024

(51) Int. Cl.
*H04L 12/66* (2006.01)
*H04B 17/318* (2015.01)
*H04W 72/20* (2023.01)
*H04W 72/542* (2023.01)

(52) U.S. Cl.
CPC ........ *H04W 72/542* (2023.01); *H04B 17/318* (2015.01); *H04W 72/20* (2023.01)

(58) Field of Classification Search
USPC .......................................................... 370/352
See application file for complete search history.

(56) References Cited

U.S. PATENT DOCUMENTS

| | | | |
|---|---|---|---|
| 2021/0160817 A1* | 5/2021 | Khoryaev | H04W 72/542 |
| 2022/0095280 A1* | 3/2022 | Farag | H04L 1/1671 |
| 2023/0114379 A1* | 4/2023 | Aktas | H04W 72/1263 370/252 |
| 2023/0164825 A1* | 5/2023 | Deng | H04W 72/40 370/329 |
| 2023/0199722 A1* | 6/2023 | Hwang | H04W 72/30 370/329 |
| 2023/0403730 A1* | 12/2023 | Shen | H04W 72/25 |
| 2024/0031999 A1* | 1/2024 | Yue | H04W 72/02 |
| 2024/0381399 A1* | 11/2024 | Hwang | H04W 4/40 |

* cited by examiner

Primary Examiner — Chuong T Ho
(74) Attorney, Agent, or Firm — Holland & Hart LLP

(57) ABSTRACT

Methods, systems, and devices for wireless communications are described. A first UE may receive an inter-UE coordination request from a second UE that requests a resource availability report. The first UE may generate the resource availability report indicating at least one slot that is determined to be available by the first UE based on one or more measurements associated with a plurality of sub-slots within the at least one slot. For example, the first UE may determine that a slot is available based on a reference signal received power value obtained from a measurement of demodulation reference signals associated with each of the plurality of sub-slots. The first UE may transmit an inter-UE coordination message to the second UE indicated the resource availability report.

30 Claims, 14 Drawing Sheets

CONSIDERATIONS ON CHANNEL SENSING FOR SIDELINK

FIELD OF TECHNOLOGY

The following relates to wireless communications, including considerations on channel sensing for sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support considerations on channel sensing for sidelink. For example, the described techniques enable a first user equipment (UE) to receive an inter-UE coordination (IUC) request from a second UE that requests a resource availability report. The first UE may generate the resource availability report indicating at least one slot that is determined to be available by the first UE based on one or more measurements associated with multiple sub-slots within the at least one slot. For example, the first UE may determine that a slot is available based on a reference signal received power value obtained from a measurement of demodulation reference signals (DMRSs) associated with each of the sub-slots. The first UE may transmit an IUC message to the second UE indicated the resource availability report.

A method for wireless communication at a first UE is described. The method may include receiving, from a second UE, an IUC request that requests a resource availability report from the first UE, generating, in response to the IUC request, the resource availability report indicating at least one slot that is available based on one or more measurements associated with a set of multiple sub-slots within the at least one slot, and transmitting, to the second UE in response to the IUC request, an IUC message that indicates the resource availability report.

An apparatus for wireless communication at a first UE is described. The apparatus may include a processor, memory coupled with the processor, and instructions stored in the memory. The instructions may be executable by the processor to cause the apparatus to receive, from a second UE, an IUC request that requests a resource availability report from the first UE, generating, in response to the IUC request, the resource availability report indicate at least one slot that is available based on one or more measurements associated with a set of multiple sub-slots within the at least one slot, and transmit, to the second UE in response to the IUC request, an IUC message that indicates the resource availability report.

Another apparatus for wireless communication at a first UE is described. The apparatus may include means for receiving, from a second UE, an IUC request that requests a resource availability report from the first UE, means for generating, in response to the IUC request, the resource availability report indicating at least one slot that is available based on one or more measurements associated with a set of multiple sub-slots within the at least one slot, and means for transmitting, to the second UE in response to the IUC request, an IUC message that indicates the resource availability report.

A non-transitory computer-readable medium storing code for wireless communication at a first UE is described. The code may include instructions executable by a processor to receive, from a second UE, an IUC request that requests a resource availability report from the first UE, generating, in response to the IUC request, the resource availability report indicate at least one slot that is available based on one or more measurements associated with a set of multiple sub-slots within the at least one slot, and transmit, to the second UE in response to the IUC request, an IUC message that indicates the resource availability report.

Some examples of the method, apparatuses, and non-transitory computer-readable medium described herein may further include operations, features, means, or instructions for measuring a DMRS associated with each of the set of multiple sub-slots within the at least one slot to obtain one or more received power measurements, where the one or more measurements include the one or more received power measurements.

In some examples of the method, apparatuses, and non-transitory computer-readable medium described herein, generating the resource availability report may include operations, features, means, or instructions for generating the resource availability report based on each of the one or more received power measurements being below a threshold power measurement.

In some examples of the method, apparatuses, and non-transitory computer-readable medium described herein, generating the resource availability report may include operations, features, means, or instructions for generating the resource availability report based on a sum of each of the one or more received power measurements being below a threshold power measurement.

In some examples of the method, apparatuses, and non-transitory computer-readable medium described herein, generating the resource availability report may include operations, features, means, or instructions for generating the resource availability report based on a mean of each of the one or more received power measurements being below a threshold power measurement.

In some examples of the method, apparatuses, and non-transitory computer-readable medium described herein, generating the resource availability report may include operations, features, means, or instructions for measuring a DMRS associated with each of the set of multiple sub-slots within the at least one slot to obtain one or more received power measurements and generating, in response to the IUC request, the resource availability report indicating the at least one slot that may be available based on a lowest received power measurement of the one or more received power measurements.

In some examples of the method, apparatuses, and non-transitory computer-readable medium described herein, generating the resource availability report may include operations, features, means, or instructions for measuring a DMRS associated with each of the set of multiple sub-slots within the at least one slot to obtain one or more received power measurements and generating, in response to the IUC request, the resource availability report indicating the at least one slot that may be available based on a highest received power measurement of the one or more received power measurements.

In some examples of the method, apparatuses, and non-transitory computer-readable medium described herein, the set of multiple sub-slots within the at least one slot include a first sub-slot that begins at a start time of the at least one slot and a second sub-slot adjacent to the first sub-slot in a time domain.

Some examples of the method, apparatuses, and non-transitory computer-readable medium described herein may further include operations, features, means, or instructions for receiving a sidelink control transmission, where the one or more measurements include one or more received power measurements associated with the sidelink control transmission.

In some examples of the method, apparatuses, and non-transitory computer-readable medium described herein, receiving the IUC request may include operations, features, means, or instructions for receiving, from the second UE, an IUC request that requests a resource availability report associated with one or more sub-slots from the first UE.

In some examples of the method, apparatuses, and non-transitory computer-readable medium described herein, the IUC request indicates a quantity of slots associated with the resource availability report.

In some examples of the method, apparatuses, and non-transitory computer-readable medium described herein, the IUC request indicates a priority associated with each of the set of multiple sub-slots.

A method for wireless communication at a second UE is described. The method may include transmitting, to a first UE, an IUC request that requests a resource availability report from the first UE and receiving, in response to the IUC request, an IUC message that indicates the resource availability report indicating at least one slot that is available based on one or more measurements associated with a set of multiple sub-slots within the at least one slot.

An apparatus for wireless communication at a second UE is described. The apparatus may include a processor, memory coupled with the processor, and instructions stored in the memory. The instructions may be executable by the processor to cause the apparatus to transmit, to a first UE, an IUC request that requests a resource availability report from the first UE and receive, in response to the IUC request, an IUC message that indicates the resource availability report indicating at least one slot that is available based on one or more measurements associated with a set of multiple sub-slots within the at least one slot.

Another apparatus for wireless communication at a second UE is described. The apparatus may include means for transmitting, to a first UE, an IUC request that requests a resource availability report from the first UE and means for receiving, in response to the IUC request, an IUC message that indicates the resource availability report indicating at least one slot that is available based on one or more measurements associated with a set of multiple sub-slots within the at least one slot.

A non-transitory computer-readable medium storing code for wireless communication at a second UE is described. The code may include instructions executable by a processor to transmit, to a first UE, an IUC request that requests a resource availability report from the first UE and receive, in response to the IUC request, an IUC message that indicates the resource availability report indicating at least one slot that is available based on one or more measurements associated with a set of multiple sub-slots within the at least one slot.

In some examples of the method, apparatuses, and non-transitory computer-readable medium described herein, the one or more measurements include one or more received power measurements associated with each of the set of multiple sub-slots within the at least one slot.

In some examples of the method, apparatuses, and non-transitory computer-readable medium described herein, receiving the IUC message may include operations, features, means, or instructions for receiving the IUC message that indicates the resource availability report based on each of the one or more received power measurements being below a threshold power measurement.

In some examples of the method, apparatuses, and non-transitory computer-readable medium described herein, receiving the IUC message may include operations, features, means, or instructions for receiving the IUC message that indicates the resource availability report based on a sum of each of the one or more received power measurements being below a threshold power measurement.

In some examples of the method, apparatuses, and non-transitory computer-readable medium described herein, receiving the IUC message may include operations, features, means, or instructions for receiving the IUC message that indicates the resource availability report based on a mean of each of the one or more received power measurements being below a threshold power measurement.

In some examples of the method, apparatuses, and non-transitory computer-readable medium described herein, the one or more measurements include one or more received power measurements, and receiving the IUC message may include operations, features, means, or instructions for receiving the IUC message that indicates the resource availability report based on a lowest received power measurement of the one or more received power measurements.

In some examples of the method, apparatuses, and non-transitory computer-readable medium described herein, the one or more measurements include one or more received power measurements, and receiving the IUC message may include operations, features, means, or instructions for receiving the IUC message that indicates the resource availability report based on a highest received power measurement of the one or more received power measurements.

In some examples of the method, apparatuses, and non-transitory computer-readable medium described herein, the set of multiple sub-slots within the at least one slot include a first sub-slot that begins at a start time of the at least one slot and a second sub-slot adjacent to the first sub-slot in a time domain.

In some examples of the method, apparatuses, and non-transitory computer-readable medium described herein, the one or more measurements include one or more received power measurements associated with a sidelink control transmission.

In some examples of the method, apparatuses, and non-transitory computer-readable medium described herein, transmitting the IUC request may include operations, features, means, or instructions for transmitting, to the first UE, an IUC request that requests a resource availability report associated with one or more sub-slots from the first UE.

In some examples of the method, apparatuses, and non-transitory computer-readable medium described herein, transmitting the IUC request may include operations, features, means, or instructions for transmitting, to the first UE, the IUC request that requests the resource availability report from the first UE, the IUC request indicating a quantity of slots associated with the resource availability report.

In some examples of the method, apparatuses, and non-transitory computer-readable medium described herein, transmitting the IUC request may include operations, features, means, or instructions for transmitting, to the first UE, the IUC request that requests the resource availability report from the first UE, the IUC request indicating a priority associated with each of the set of multiple sub-slots within the at least one slot.

DETAILED DESCRIPTION

In some cases, a user equipment (UE) may perform sidelink communications according to one or more different resource formats. In some examples, different formats may allocate a different quantity of symbols within a slot or a sub-slot (e.g., a mini-slot), and may have different patterns, for example, for sub-slot lengths or quantity of sub-slots per slot. However, the different resource formats may introduce uncertainty regarding resource sensing at a UE for sidelink communications, such as when the UE attempts to determine whether a slot or sub-slot is available.

In accordance with examples described herein, a first UE may receive, from a second UE, an inter-UE coordination (IUC) request, which triggers or requests a resource availability report from the first UE. The first UE may generate the resource availability report based on one or more measurements associated with multiple sub-slots (e.g., mini-slots) of a slot. For example, the first UE may measure one or more demodulation reference signals (DMRSs) to obtain one or more measured reference signal received power (RSRP) values associated with the multiple sub-slots, and the first UE may compare the RSRP values with one or more threshold values to determine if a slot or sub-slot is available. In some examples, the first UE may determine that a slot is available based on measurements associated with each sub-slot of the slot. Alternatively, the first UE may determine that the slot is available based on measurements associated with a partial quantity of sub-slots of the slot. The first UE may transmit an IUC message to the second UE indicating the resource availability report, which may indicate one or more slots determined to be available by the first UE.

Aspects of the disclosure are initially described in the context of wireless communications systems. Aspects of the disclosure are additionally described with respect to slot diagrams. Aspects of the disclosure are further illustrated by and described with reference to apparatus diagrams, system diagrams, and flowcharts that relate to considerations on channel sensing for sidelink.

Figure 1:
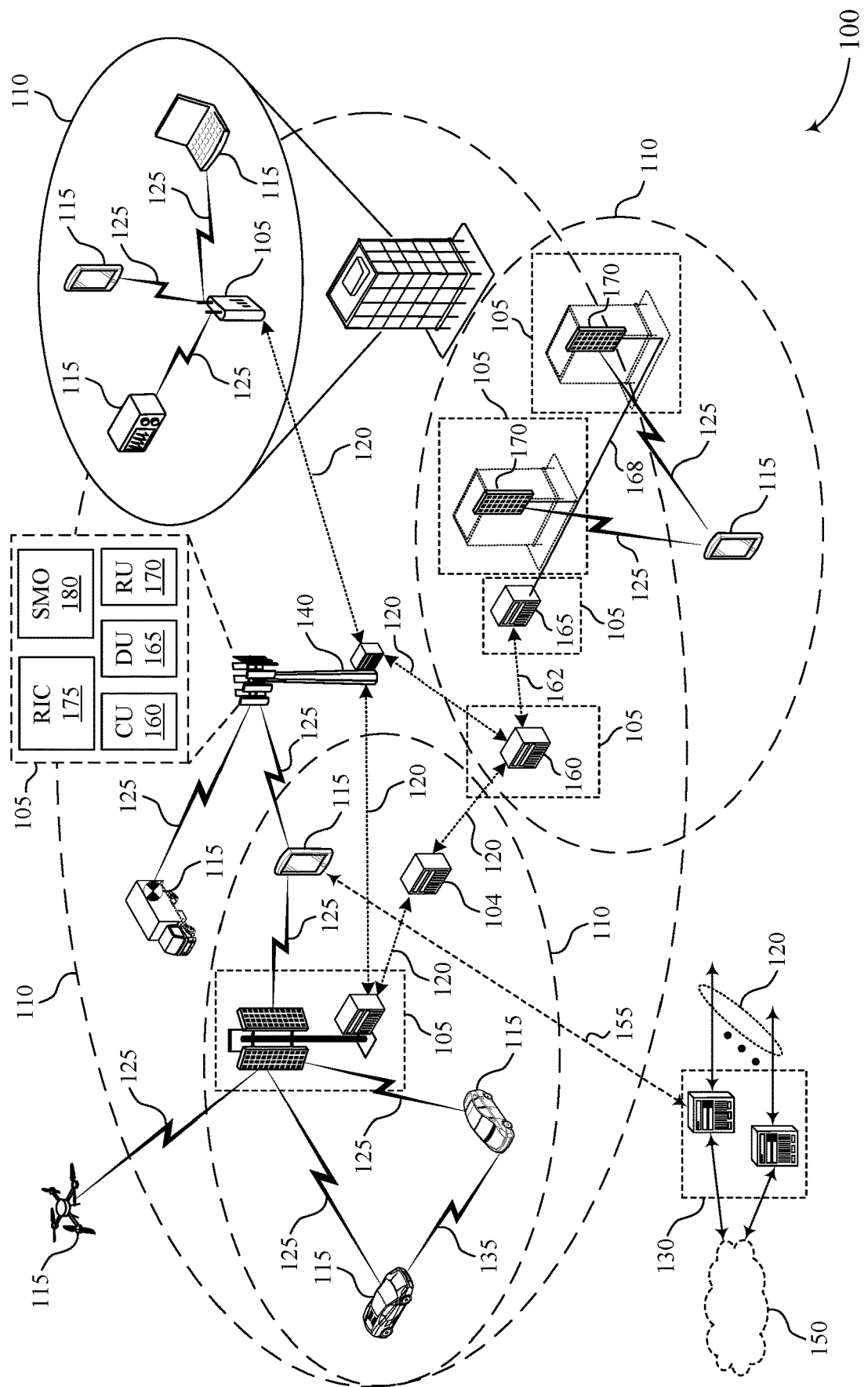
FIG. 1 illustrates an example of a wireless communications system that supports considerations on channel sensing for sidelink in accordance with one or more aspects of the present disclosure.

FIG. 1 illustrates an example of a wireless communications system 100 that supports considerations on channel sensing for sidelink in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support considerations on channel sensing for sidelink as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, a UE 115 may perform sidelink communications according to one or more different resource formats. In some examples, different formats may allocate a different quantity of symbols within a slot or a sub-slot (e.g., a mini-slot), and may have different patterns (e.g., for a sub-slot length and a quantity of sub-slots per slot). However, the different resource formats may introduce uncertainty regarding resource sensing at a UE 115 for sidelink communications, such as when the UE 115 attempts to determine whether a slot or sub-slot is available.

In accordance with examples as described herein, a first UE 115 may receive, from a second UE 115, an IUC request requesting a resource availability report. The first UE 115 may generate the resource availability report based on one or more measurements associated with multiple sub-slots (e.g., mini-slots) of a slot. For example, the first UE 115 may measure one or more DMRSs to obtain one or more measured RSRP values associated with the multiple sub-slots, and the first UE may compare the RSRP values with one or more threshold values to determine if a slot or sub-slot is available. In some examples, the first UE may determine that a slot is available based on measurements associated with each sub-slot of the slot. Alternatively, the first UE may determine that the slot is available based on measurements associated with a partial quantity of sub-slots of the slot. Details regarding the determination of slot availability are described in further detail herein, with reference to FIGS. 2-4. The first UE 115 may transmit an IUC message to the second UE 115 indicating the resource availability report, which may indicate one or more slots determined to be available by the first UE 115.

Figure 2:
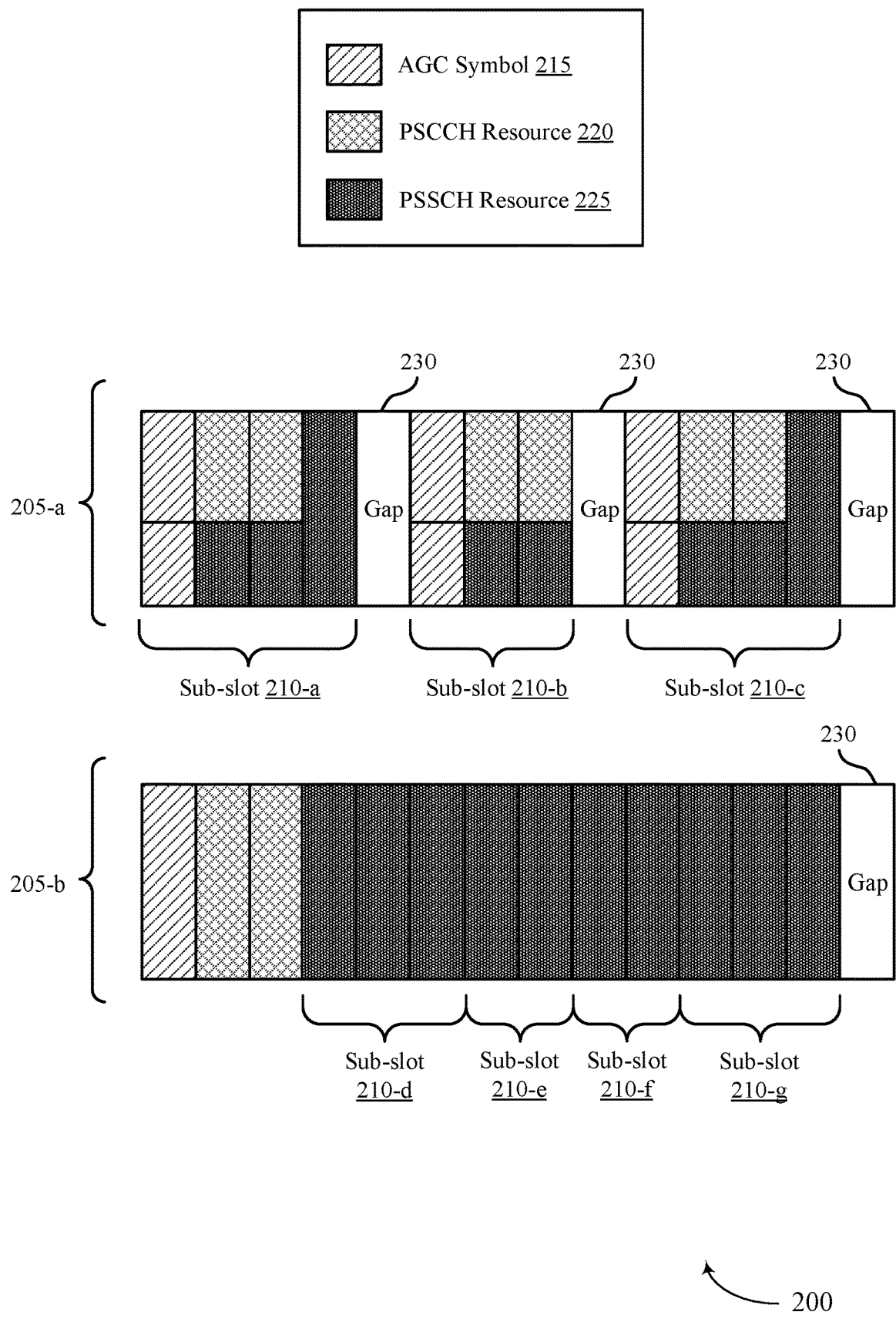
FIG. 2 illustrates an example of a slot diagram that supports considerations on channel sensing for sidelink in accordance with one or more aspects of the present disclosure.

FIG. 2 illustrates an example of a slot diagram 200 that supports considerations on channel sensing for sidelink in accordance with one or more aspects of the present disclosure. The slot diagram 200 illustrates a slot 205-*a* and a slot 205-*b*, which may be implemented in a wireless communications system 100 as described herein, with reference to FIG. 1.

In some examples, a UE 115 may be configured with a set of resource pools for sidelink operations, and each resource pool may be or include a time-frequency resource. The UE 115 may be associated with a minimum allocation (e.g., transmission or reception) time unit (e.g., a subchannel), which may be a quantity of contiguous resource blocks or symbols. In some examples, each resource pool may be configured with an allocation mode. For example, in a first mode, a network entity 105 may assign resources for sidelink transmissions to the UE 115 (e.g., using dynamic allocations via downlink control information (DCI), configured transmissions such as Type 1 or Type 2 transmissions, or other examples). In a second mode, the UE 115 may be configured to perform resource sensing to determine available resources, and the UE 115 may select resources for sidelink transmissions based on priorities of sensed transmissions and RSRP measurements, for example.

In some examples, resource allocation for sidelink communication may be based on reservations. For example, a UE 115 may reserve a resource in units of subchannels in the frequency domain, and slots in the time domain. In some cases, the resource reservations may be limited to one time slot in the time domain. Reservation information may be carried using sidelink control information (SCI), and a transmission may reserve resources in a current slot used for the transmission, and in some cases, up to a threshold quantity (e.g., two, three, five) future slots. In some examples, a UE 115 may perform a periodic resource reservation, which may repeat within a signaled period. In some cases, a UE 115 may perform resource sensing by, for example, receiving SCIs from nearby transmitting UEs 115, and determine resources that are available to be used by the transmitting UE 115 in future sidelink communications based on the received SCIs.

In some examples, UEs 115 may perform IUC procedures. For example, a UE 115 may share information (e.g., in IUC messages) to one or more other UEs 115. Similarly, a UE 115 may receive information (e.g., in IUC message) from one or more other UEs 115. In some cases (e.g., Scheme 1), a transmitting UE 115 may select or reselect communication resources based on assistance information received from nearby sidelink UEs 115. For example, the nearby sidelink UEs 115 may indicate preferred resource or non-preferred resources to the transmitting UE 115. In some examples, the assistance information may be transmitted by a UE 115 based on a request from the transmitting UE 115. In other examples, the assistance information may be transmitted by a UE 115 based on a condition being satisfied at the UE 115. In some cases (e.g., Scheme 2), a transmitting UE 115 may select communication resources and broadcast reservation messages. A nearby UE 115 may receive the reservation message and transmit a message to the transmitting UE 115 indicating that the nearby UE 115 has a conflict with a resources selected by the transmitting UE 115.

A transmitting UE 115 may transmit a request (e.g., an IUC request message) for a nearby UE 115 to provide assistance information (e.g., IUC information) regarding preferred or non-preferred resources for a transmission from the transmitting UE 115 to the nearby UE 115. The request may include, for example, a priority value for the transmission, a quantity of subchannels for the transmission, a resource reservation interval, starting times and ending times of a resource selection window, or a combination thereof. In some examples, the assistance information may include an indication of resources (e.g., preferred resources or a preference for one or more resources) that the nearby UE 115 may prefer the transmitting UE 115 to use for the transmission. Additionally, or alternatively, the assistance information may include an indication of resources (e.g., non-preferred resources) that the nearby UE 115 prefers the transmitting UE 115 not use for the transmission.

A transmitting UE 115 may receive coordination information (e.g., assistance information or IUC information) indicating resources, and the transmitting UE 115 may attempt to use the indicated preferred resources for the transmission. For example, when a transmitting UE 115 receives coordination information (e.g., IUC information), the transmitting UE 115 may select or re-select resources for transmission based on a sensing result by the transmitting UE 115, the received coordination information, or both. Additionally, or alternatively, the transmitting UE 115 may determine a whether to perform a retransmission based on received coordination information. In some examples, IUC requests and messages may be assigned dedicated resources and periodicities, which may improve reliability and reduce latency.

In accordance with examples as described herein, a UE 115 may transmit an IUC message indicating a resource availability report. The resource availability report may indicate one or more slots 205 that are determined as available by the UE 115. In some examples, the UE 115 may determine if a slot 205 is available based on a sensed availability of one or more sub-slots 210 (e.g., mini-slots) within the slot 205.

The slot 205-a may follow a first format (e.g., Format 1) that may support sub-slot 210 resource allocation or scheduling in a sub-channel (e.g., via a set of frequency resources). For example, the slot 205-a may follow a symbol pattern that includes a sub-slot 210-a, a sub-slot 210-b, and a sub-slot 210-c. In some examples, the sub-slots may have different quantities of symbols or different symbols sizes. For example, the sub-slot 210-a and the sub-slot 210-c may each have a symbol size of four symbols, and the sub-slot 210-b may have a symbol size of three symbols. Each sub-slot 210 may support physical sidelink control channel (PSCCH) resources 220 and physical sidelink shared channel (PSSCH) resources 225. The slot 205-a may have one or more symbols allocated as automatic gain control (AGC) symbols 215, which may allow a UE 115 to set (e.g., regulate) a gain associated with a receiver of the UE 115. The AGC symbols 215 may be split into a portion corresponding to a PSCCH resource 220 and a portion corresponding to the PSSCH resource 225.

In some examples, a sub-slot 210 may be separated from another sub-slot by one or more gap symbols 230. As a quantity of sub-slots 210 per slot 205 increases (e.g., to decrease scheduling latency, which may be suitable for small packet sizes), more symbols may be allocated as gap symbols 230. An increased quantity of sub-slots 210 per slot 205 may decrease scheduling latency and may be suitable for small packet sizes (e.g., 32 bits). In some examples, the gap symbols 230 may provide time for a UE 115 to switch from a receiving mode to a transmitting mode, or vice-versa. In some examples, a UE 115 may support reservations of one or more sub-slots 210. For example, the UE 115 may transmit (e.g., broadcast) an SCI that indicates a reservation of one or more sub-slots 210.

The slot 205-b may follow a second format (e.g., Format 2) that may support sub-slot 210 scheduling in a sub-channel. For example, the slot 205-a may follow a symbol pattern that includes a sub-slot 210-d, a sub-slot 210-e, a sub-slot 210-f, and a sub-slot 210-g. In some examples, the sub-slots may have different quantities of symbols or different symbol sizes. For example, the sub-slot 210-d and the sub-slot 210-g may each have a symbol size of three symbols, and the sub-slot 210-e and the sub-slot 210-f may each have a symbol size of two symbols. The slot 205-a may have a symbol allocated as an AGC symbols 215, which may allow a UE 115 to set (e.g., regulate) a gain associated with a receiver of the UE 115. In some examples, the sub-slot 210-d, the sub-slot 210-3, the sub-slot 210-f, and the sub-slot 210-g may not contain an AGC symbol 215. In these examples, the UE 115 may use a same setting for the receiver of the UE 115 for reception of a PSSCH resource 225 than a setting used for reception of PSCCH resource 220. The slot 205-b may allocate a last symbol of the slot 205-b as a gap symbol 230.

Figure 3:
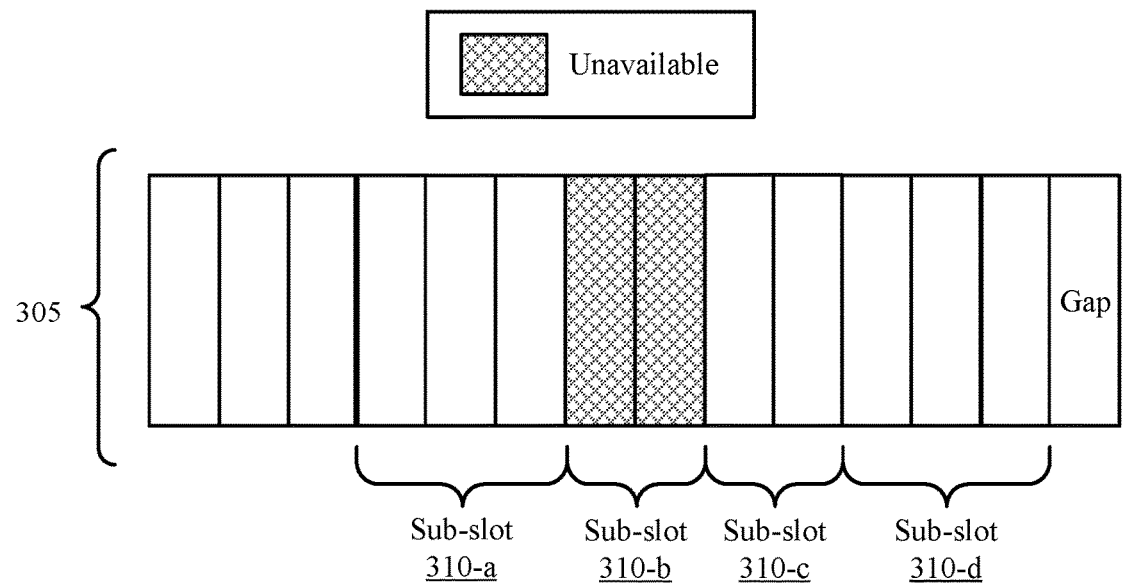
FIG. 3 illustrates an example of a wireless communications system that supports considerations on channel sensing for sidelink in accordance with one or more aspects of the present disclosure.
Figure 3:
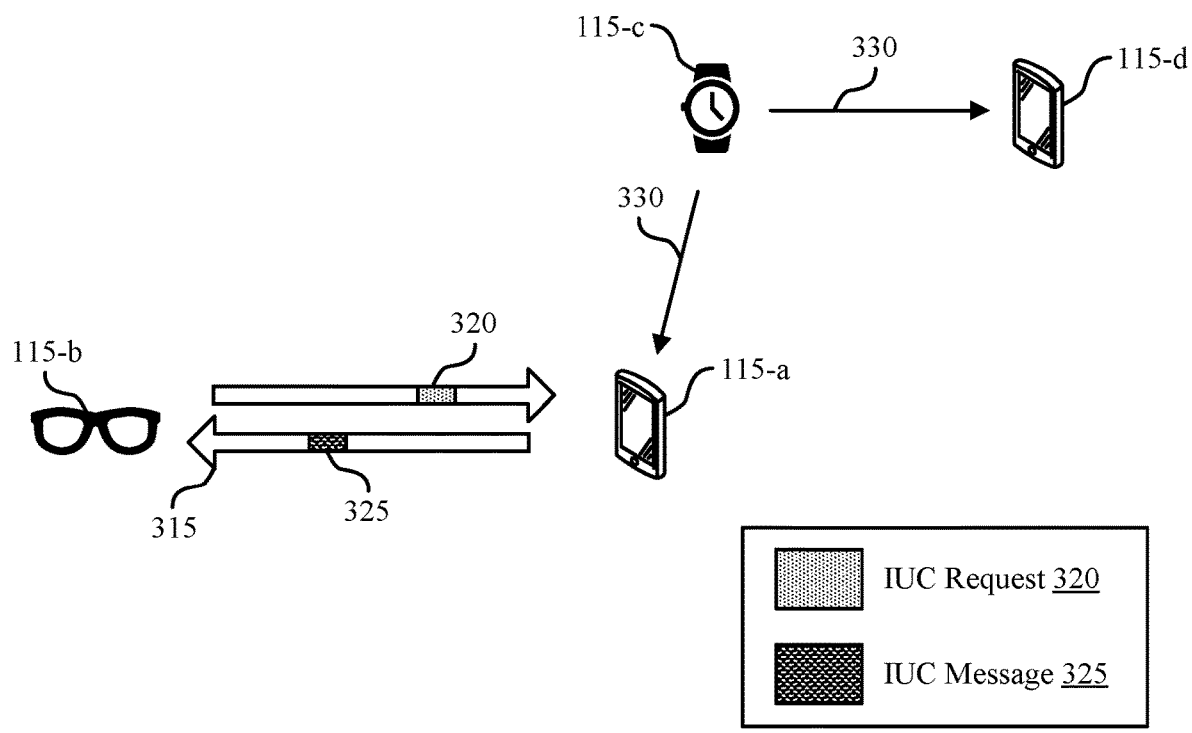

FIG. 3 illustrates an example of a wireless communications system 300 that supports considerations on channel sensing for sidelink in accordance with one or more aspects of the present disclosure. The wireless communications system 300 may implement aspects of wireless communications system 100 and the slot diagram 200. For example, the wireless communication system 300 may include a UE 115-a, a UE 115-b, a UE 115-c, and a UE 115-d, which may be examples of UEs 115 as described herein, with reference to FIGS. 1 and 2. In some examples, the UEs 115 may be example of wearable, peripheral, or reduced-capability devices. The UEs 115 may communicate via sidelink communication links 315, which may be an example of communication links 125, as described herein with reference to FIG. 1. Additionally, FIG. 3 illustrates a slot 305 that supports sub-slot 310 scheduling as described in more detail herein, with reference to FIG. 2. For example, slot 305 may be split into a sub-slot 305-a, a sub-slot 305-b, a sub-slot 305-c, and a sub-slot 305-d.

In some examples, such as when UEs 115 perform sidelink communications in a mode (e.g., mode 1 or mode 2 resource allocation) based on resource sensing, collisions may occur between UE 115 transmissions. To reduce the frequency of collisions, UEs 115 may be configured to share sensing information with each other via IUC messages. For example, the UE 115-a may provide results from resource sensing performed by the UE 115-a to the UE 115-b via an IUC message. The IUC message may indicate, for example, one or more resources or resource preference for reception by the UE 115-a, which may have been determined based on the resource sensing. The results from the resource sensing may be used by the UE 115-b to complement resource sensing by the UE 115-b. Alternatively, such as in cases where the UE 115-b is power sensitive or has limited resource sensing capabilities (e.g., if the UE 115 is a wearable device), the results from the resource sensing by the UE 115-a may entirely replace resource sensing by the UE 115-b. Accordingly, the UE 115-b may be aware of reservations detected by the UE 115-a and may be able to avoid collisions based on the sharing of sensing information.

In some examples, an IUC message to share sensing information may be generated by the UE 115-a using different approaches. In one approach (e.g., a baseline approach), the UE 115-a may identify resources available for the UE 115-b in a same manner as the UE 115-a would identify resources for a transmission for itself (e.g., as if the UE 115-a were to perform a sidelink transmission). For example, the UE 115-a may identify a resource as unavailable if an RSRP measurement value for a transmission resource is above a threshold value.

In another approach (e.g., a signal-to-interference ratio (SIR) approach), the UE 115-a may identify available resources for the UE 115-b by considering an RSRP value of an intended link (e.g., a link between the UE 115-a and the UE 115-b) and accumulative RSRP values of interfering links (e.g., a transmission 330 by UE 115-c). For example, the UE 115-a may determine that a resource n is available if an SIR corresponding to the resource n, given by Equation 1 below, is above a threshold value, where $RSRP_{intended}^{n}$ corresponds to the RSRP value of the intended link using resource n and $RSRP_{interfering}^{n}$ corresponds to the RSRP value of the interfering links on resource n.

$$SIR^{n} = \frac{RSRP_{intended}^{n}}{RSRP_{interfering}^{n}} \tag{1}$$

The UE 115-b may receive IUC information from the UE 115-a indicating a preferred resource set or a non-preferred resource set. The UE 115-b may transmit using resources based on the received IUC information from the UE 115-a and, in some cases, sensing performed by the UE 115-b or IUC information received from other UEs 115. In some cases, the UE 115-b may check if a quantity of candidate resources is below a threshold (e.g., a minimum threshold), and if so, the UE 115-b may include resources outside the preferred resource set or inside the non-preferred resource set until the minimum threshold is satisfied.

In some examples, a UE 115 may transmit IUC information using a MAC-CE message or an SCI 2-C message. In some cases, the UE 115 may use a MAC-CE message for indicating more than two preferred resources or non-preferred resources, and the UE 115 may use a MAC-CE or an SCI 2-C message when indicating two or less preferred resources or non-preferred resources. The preferred resources or non-preferred resources may be indicated using one or more of a time resource indicator value (TRIV), a frequency resource indicator value (FRIV), and a resource reservation interval (RRI).

The message containing IUC information may include one or more fields corresponding to an indicator for providing or requesting information, resource combinations, first resource location, reference slot location, resource set type, and lowest subchannel indices for the first resource location of each TRIV. In some examples, the field size (e.g., in bits) for the field corresponding to resource combinations may be given by Equation 2 below, where N corresponds to the resource number indicated in the IUC information; $N_{subChannel}^{SL}$ may be provided by a first higher layer parameter (e.g., sl-NumSubchannel); and Y is given by Equation 3 below, where $N_{rsv\_period}$ is the quantity of entries in a second higher layer parameter (e.g., sl-resourcereservePeriodList) if the second higher layer parameter is configured or zero if the second higher layer parameter is not configured.

$$N*\left\{\log_2 \frac{N_{subChannel}^{SL}(N_{subChannel}^{SL}+1)(2N_{subChannel}^{SL}+1)}{6}\right\} + 9 + Y \tag{2}$$

$$Y = \log_2 N_{rsv\_period} \tag{3}$$

In further examples, the field size for the field corresponding to the first resource locations may be given by Equation 4 below, where X is provided by a configured or preconfigured maximum value of a slot offset for a case in which the message is used as a container of IUC information.

$$(N-1)*\log_2 X \tag{4}$$

The field size for the field corresponding to the reference first slot location may be given by Equation 5 below, where µ is a value of zero, one, two or three corresponding to a subcarrier spacing (SCS) of 15 kHz, 30 kHz, 60 kHz, or 120 kHz, respectively.

$$10+\log_2(10*2^{\mu}) \tag{5}$$

The field size for the field corresponding to the lowest subchannel indices for the first resource location of each TRIV may be given by Equation 6 below.

$$N*\log_2 N_{subChannel}^{SL} \tag{6}$$

In some cases, a UE 115 may perform sidelink communications according to one or more different resource formats (e.g., Format 1 and Format 2) for slots 305. In some examples, different formats may allocate a different quantity of symbols within a slot 305 or a sub-slot 310, and may have different patterns (e.g., for a sub-slot 310 length and a quantity of sub-slots 310 per slot), as described herein with reference to FIG. 2. However, the different resource formats may introduce uncertainty regarding resource sensing at the UE 115-a for sidelink communications, such as when the UE 115-a attempts to determine whether a slot or sub-slot 210 is available.

In accordance with examples as described herein, the UE 115-a may receive, from the UE 115-b, an IUC request 320 that requests a resource availability report. In some examples, the IUC request 320 may be transmitted by the UE 115-b per sub-slot 310, bundle of sub-slots 310, slot 305, transport block, or a combination thereof. The IUC request 320 may be transmitted in a resource that is reserved for IUC requests 320 (e.g., a dedicated resource). In some examples, the IUC request 320 may include an indication of a type of resource availability report. For example, the IUC request 320 may indicate a report size, which may limit the quantity of slots 305 or sub-slots 310 to be included in the resource availability report. In some cases, the UE 115-b may indicate one or more priorities associated with one or more sub-slots in the IUC request 320. In some examples, the IUC request 320 may request soft information associated with one or more sub-slots. For example, the IUC request 320 may request that the UE 115-*a* reports RSRP values associated with the one or more sub-slots (e.g., in the resource availability report).

The UE 115-*a* may generate the resource availability report based on one or more measurements associated with multiple sub-slots 310 of a slot. The UE 115-*a* may decode an SCI from other UEs 115 (e.g., UE 115-*c*) carried on a PSCCH resource. The UE 115-*a* may determine an RSRP based on the SCI and may measure a DMRS to obtain an RSRP value associated with each sub-slot 310 (e.g., indicated in the SCI) of the slot 305. In some examples, the UE 115-*a* may detect multiple SCIs and obtain multiple RSRP values associated with multiple sub-slots 310 of the slot 305. The UE 115-*a* may determine whether each sub-slot 310 of the slot 305 is available or unavailable, and the UE 115-*a* may determine whether the slot 305 is available or unavailable based on combining functions, rule, or conditions and the availability and RSRP values associated with each sub-slot 310.

For example, the UE 115-*a* may detect a transmission 330 (e.g., an SCI) of UE 115-*c* indicating a resource reservation. The UE 115-*a* may measure a DMRS associated with a PSCCH of the slot 305 and determine an RSRP value associated with the PSCCH of the slot 305. The UE 115-*a* may then measure a DMRS associated with each of the sub-slots 310 of the slot 305 and determine an RSRP value associated with each of the sub-slots 310. For example, the UE 115-*a* may determine that an RSRP value associated with the sub-slot 310-*a* is below a threshold power measurement and determine that the sub-slot 310-*a* is available. The UE 115-*a* may also determine that an RSRP value associated with the sub-slot 310-*b* is above a threshold power measurement and determine that the sub-slot 310-*b* is unavailable. The UE 115-*a* may continue this process and determine that the sub-slot 310-*c* and the sub-slot 310-*d* are available. The UE 115-*a* may determine that the slot 305 is available based on the measurements performed corresponding to each of the sub-slots 310.

In some examples, the UE 115-*a* may determine that the slot 305 is available based on a sum of the RSRP values associated with each of the sub-slots 310 being below a threshold power value. Additionally, or alternatively, the UE 115-*a* may determine that the slot 305 is available based on a mean of the RSRP values associated with each of the sub-slots 310 being below a threshold power value. That is, the UE 115-*a* may obtain a sum of each of the RSRP values corresponding to each sub-slot 310, and the UE 115-*a* may divide the sum by the quantity of sub-slots in slot 305 and compare the result with the threshold power value. In other examples, the UE 115-*a* may determine that the slot 305 is available by applying a threshold to each sub-slot 310 and then combining the results to decide (e.g., using an AND operation) if the slot 305 is available. For example, the UE 115-*a* may determine that each of the sub-slot 310-*a*, the sub-slot 310-*b*, the sub-slot 310-*c* and the sub-slot 310-*d* have RSRP values below a threshold power value, and the UE 115-*a* may decide that the slot 305 is available. Accordingly, a sensing rule for determining whether the slot 305 is available may be a rule or function based on four RSRP values corresponding to each of the four sub-slots 310.

In some examples, the UE 115-*a* may determine a highest RSRP value of each of the RSRP values associated with each of the sub-slots 310, and the UE 115-*a* may determine that the slot 305 is available based on the highest RSRP value being below a threshold power value. Additionally, or alternatively, the UE 115-*a* may determine a lowest RSRP value of each of the RSRP values associated with each of the sub-slots 310, and the UE 115-*a* may determine that the slot 305 is available based on the lowest RSRP value being below a threshold power value.

In some cases, such as in cases in which transport block repetition is used across all sub-slots 310 and a sub-slot has no DMRS, the UE 115-*a* may determine whether the slot 305 is available based on RSRP values associated with the PSCCH of the slot 305. That is, if one or more of the sub-slots 310 do not have DMRS, the UE 115-*a* may use an RSRP value corresponding to the PSCCH of the slot 305 instead of an RSRP values corresponding to a DMRS of the one or more sub-slots 310 for performing functions to determine if slot 405 is available or unavailable. For example, if the sub-slot 310-*c* and the sub-slot 310-*d* do not have an associated DMRS, the UE 115-*a* may use the RSRP associated with the PSCCH of the slot 305 in procedures to determine the availability of the sub-slot 310-*c*, and the sub-slot 310-*d*, and the slot 305.

In some examples, such as when the slot 305 is of a format that supports transmission and reception during the slot 305 (e.g., Format 1), the determination of whether the slot 305 or a sub-slot 310 is available may be based on whether the UE 115-*a* is receiving, transmitting, or both. That is, combining functions, rules, or conditions for determining whether the slot 305 is available. For example, the UE 115-*a* may use different threshold power values depending on whether the UE 115-*a* is receiving, transmitting, or both, during the slot 305 or during each individual sub-slot 310. Similarly, the combining functions, rules, or conditions for determining whether the slot 305 is available may be different based on whether each of the sub-slots 310 of the slot 305 are using a same transport block or different transport blocks.

In some examples, such as in transport block repetition cases, the UE 115-*a* may use a portion of the sub-slots 310 for the functions, rules, or conditions described herein to determine whether the slot 305 is available. For example, the UE 115-*a* may be configured to perform a computation based on a configured quantity of sub-slots 310. That is, in some cases, the UE 115-*a* may use RSRP values associated with the first two sub-slots (e.g., sub-slot 310-*a* and sub-slot 310-*b*) to determine whether the slot 310 is available. By measuring some of the sub-slots 310 in the determining, the UE 115-*a* may reduce a quantity of computations performed, which may reduce power consumption and improve processing speed.

In some examples, the UE 115-*c* may send different transport blocks across one or more of the sub-slots 310. For example, the UE 115-*c* may send a first transport block across the sub-slot 310-*a* and the sub-slot 310-*b*, and may send a second transport block (e.g., which may be a repetition of the first transport block) across the sub-slot 310-*c* and the sub-slot 310-*d*. The UE 115-*a* may determine the utilization of each sub-slot 310 of the slot 305 (e.g., based on a received SCI), and may determine the availability of the slot 305 based on the determined utilization. For example, the UE 115-*a* may determine the RSRP values for each sub-slot, and then perform a combining function (e.g., a sum, mean, or AND function) across each mini-slot corresponding to each transport block. Based on the example above, the UE 115-*a* may use a first combining function to combine the RSRP values corresponding to the sub-slot 310-*a* and the sub-slot 310-*b*, and a second combining function to combine the RSRP values corresponding to the sub-slot 310-*c* and the sub-slot 310-*d*. Then, the UE 115-*a* may use a third combining function to combine the results of the first combining function and the second combining function. The first, second, and third combining functions may be a same combining function, or they may be different combining functions.

The UE 115-*a* may determine that the slot 305 is available and include the slot 305 in the resource availability report. Similarly, the UE 115-*a* may determine other slots 305 that are available and include them in the resource availability report. In some examples, the UE 115-*a* may indicate individual sub-slots 310 that are available in the resource availability report (e.g., in addition to or instead of slots 305). The UE 115-*a* may then transmit an IUC message 325 to the UE 115-*b* that indicates the resource availability report. In some cases, the UE 115-*a* may limit the size of the resource availability report based on an indication of a report size (e.g., if included in the IUC request 320). In some examples, the UE 115-*a* may include information related to the RSRP of each sub-slot 310 in the IUC message 325 (e.g., if requested in the IUC request 320). The UE 115-*a* may rank the slots 305 (e.g., or sub-slots 310) included in the resource availability report based on a priority of the sub-slots 310 associated with the UE 115-*b* (e.g., if priority information was received in the IUC request 320 or another message). Accordingly, the UE 115-*b* may perform sidelink communications based on resource sensing performed by the UE 115-*a*.

Figure 4:
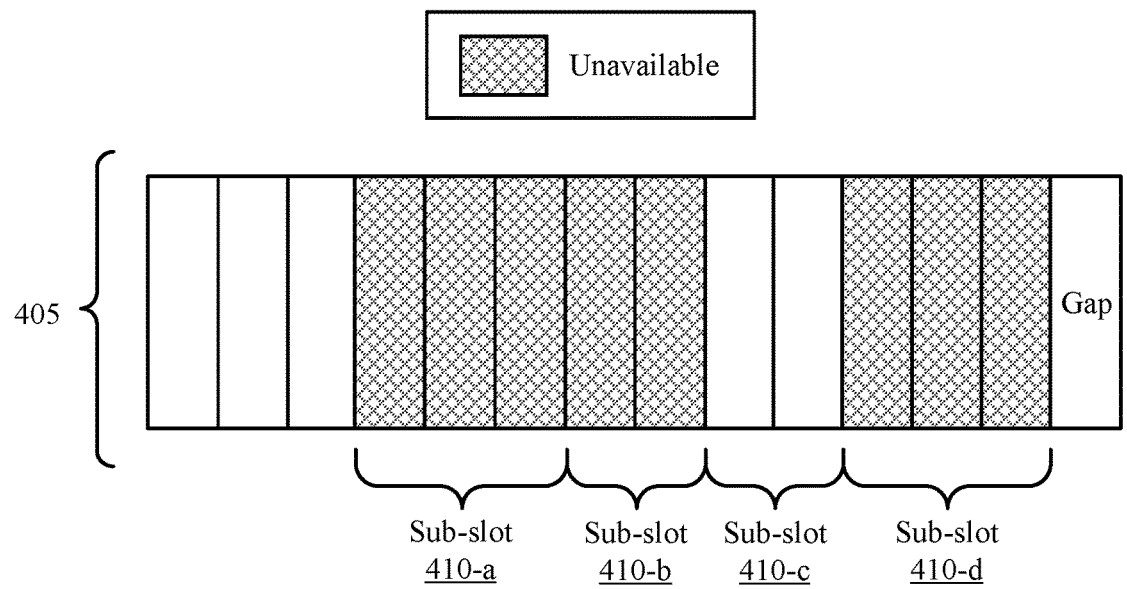
FIG. 4 illustrates an example of a wireless communications system that supports considerations on channel sensing for sidelink in accordance with one or more aspects of the present disclosure.
Figure 4:
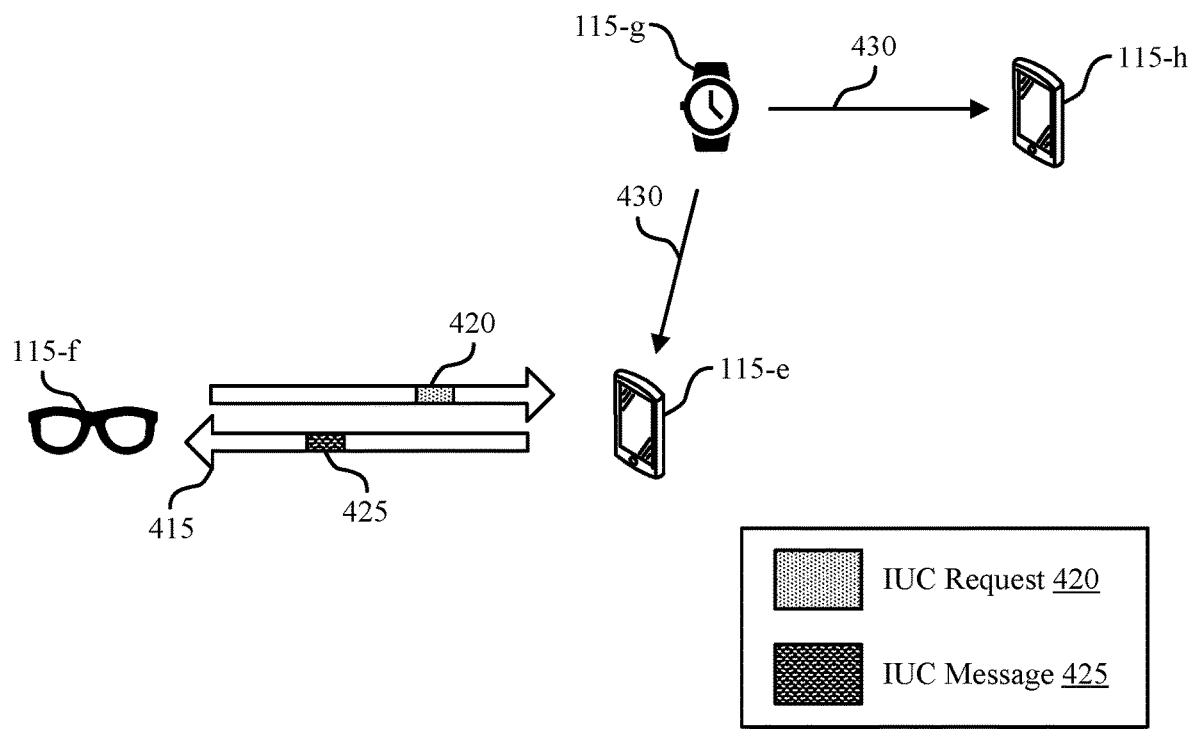

FIG. 4 illustrates an example of a wireless communications system 400 that supports considerations on channel sensing for sidelink in accordance with one or more aspects of the present disclosure. The wireless communications system 400 may implement aspects of wireless communications system 100, the wireless communication system 300, and the slot diagram 200. For example, the wireless communication system 300 may include a UE 115-*e*, a UE 115-*f*, a UE 115-*g*, and a UE 115-*h*, which may be examples of UEs 115 as described herein, with reference to FIGS. 1 through 3. In some examples, the UEs 115 may be example of wearable, peripheral, or reduced-capability devices. The UEs 115 may communicate via sidelink communication links 415, which may be an example of communication links 125 or sidelink communication links 315, as described herein with reference to FIGS. 1 and 3. Additionally, FIG. 4 illustrates a slot 405 that supports sub-slot 410 scheduling as described in more detail herein, with reference to FIGS. 2 and 3. For example, slot 405 may be split into a sub-slot 405-*a*, a sub-slot 405-*b*, a sub-slot 405-*c*, and a sub-slot 405-*d*.

In some cases, a UE 115 may perform sidelink communications according to one or more different resource formats (e.g., Format 1 and Format 2) for slots 405. In some examples, different formats may allocate a different quantity of symbols within a slot 405 or a sub-slot 410, and may have different patterns (e.g., for a sub-slot 410 length and a quantity of sub-slots 410 per slot), as described herein with reference to FIG. 2. However, the different resource formats may introduce uncertainty regarding resource sensing at the UE 115-*e* for sidelink communications, such as when the UE 115-*e* attempts to determine whether a slot or sub-slot 210 is available.

In accordance with examples as described herein, the UE 115-*e* may receive, from the UE 115-*f*, an IUC request 420 that requests a resource availability report. In some examples, the IUC request 420 may be transmitted by the UE 115-*f* per sub-slot 410, bundle of sub-slots 410, slot 405, transport block, or a combination thereof. The IUC request 420 may be transmitted in a resource that is reserved for IUC requests 420 (e.g., dedicated resources). In some examples, the IUC request 420 may include an indication of a type of resource availability report. For example, the IUC request 420 may indicate a report size, which may limit the quantity of slots 405 or sub-slots 410 to be included in the resource availability report. In some cases, the UE 115-*f* may indicate one or more priorities associated with one or more sub-slots in the IUC request 420. In some examples, the IUC request 420 may request soft information associated with one or more sub-slots. For example, the IUC request 420 may request that the UE 115-*e* reports RSRP values associated with the one or more sub-slots (e.g., in the resource availability report).

The UE 115-*e* may generate the resource availability report based on one or more measurements associated with multiple sub-slots 410 of a slot. The UE 115-*e* may decode an SCI from other UEs 115 (e.g., UE 115-*g*) carried on a PSCCH resource. The UE 115-*e* may determine an RSRP based on the SCI and may measure a DMRS to obtain an RSRP value associated with each sub-slot 410 (e.g., indicated in the SCI) of the slot 405. In some examples, the UE 115-*e* may detect multiple SCIs and obtain multiple RSRP values associated with multiple sub-slots 410 of the slot 405. The UE 115-*e* may determine whether each sub-slot 410 of the slot 405 is available or unavailable, and the UE 115-*e* may determine whether the slot 405 is available or unavailable based on combining functions, rule, or conditions and the availability and RSRP values associated with each sub-slot 410.

For example, the UE 115-*e* may detect a transmission 430 (e.g., an SCI) of UE 115-*g* indicating a resource reservation. The UE 115-*e* may measure a DMRS associated with a PSCCH of the slot 405 and determine an RSRP value associated with the PSCCH of the slot 405. The UE 115-*e* may then measure a DMRS associated with each of the sub-slots 410 of the slot 405 and determine an RSRP value associated with each of the sub-slots 410. For example, the UE 115-*e* may determine that an RSRP value associated with the sub-slot 410-*a* is above a threshold power measurement and determine that the sub-slot 410-*a* is unavailable. The UE 115-*e* may also determine that an RSRP values associated with the sub-slot 410-*b* is above a threshold power measurement and determine that the sub-slot 410-*b* is also unavailable. The UE 115-*e* may continue this process and determine that the sub-slot 410-*c* is available and that the sub-slot 410-*d* is unavailable. The UE 115-*e* then may determine that the slot 405 is unavailable based on the measurements performed corresponding to each of the sub-slots 410.

In some examples, the UE 115-*e* may determine that the slot 405 is unavailable based on a sum of the RSRP values associated with each of the sub-slots 410 being above a threshold power value. Additionally, or alternatively, the UE 115-*e* may determine that the slot 405 is unavailable based on a mean of the RSRP values associated with each of the sub-slots 410 being above a threshold power value. That is, the UE 115-*e* may obtain a sum of each of the RSRP values corresponding to each sub-slot 410, and the UE 115-*e* may divide the sum by the quantity of sub-slots in slot 405 and compare the result with the threshold power value. In other examples, the UE 115-*e* may determine that the slot 405 is unavailable by applying a threshold to each sub-slot 410 and then combining the results to decide (e.g., using an AND operation) if the slot 405 is available or unavailable. For example, the UE 115-*e* may determine any one of the sub-slot 410-*a*, the sub-slot 410-*b*, the sub-slot 410-*c* and the sub-slot 410-*d* have RSRP values above a threshold power value, and the UE 115-*e* may decide that the slot 405 is unavailable. Accordingly, a sensing rule for determining whether the slot 405 is available may be a rule or function based on four RSRP values corresponding to each of the four sub-slots 410.

In some examples, the UE 115-*e* may determine that the slot 405 is unavailable prior to performing measurements or combining functions on all of the sub-slots 410 of the slot 405. For example, the UE 115-*e* may determine that the sub-slot 410-*a* and the sub-slot 410-*b* are unavailable and determine that the slot 405 is unavailable without performing RSRP measurements on the sub-slot 410-*c* and the sub-slot 410-*d*. Additionally, or alternatively, the UE 115-*e* may determine that the sum of the RSRP values of the sub-slot 410-*a* and the sub-slot 410-*b* are above the threshold power measurement, and refrain from evaluating any further sub-slots 410. In some examples, the UE 115-*e* may refrain from evaluating any further sub-slots 410 after determining that a single sub-slot 410 is unavailable. Accordingly, the UE 115-*e* may reduce processing power associated with measuring RSRP values or performing combination functions.

In some examples, the UE 115-*e* may determine a highest RSRP value of each of the RSRP values associated with each of the sub-slots 410, and the UE 115-*e* may determine that the slot 405 is unavailable based on the highest RSRP value being above a threshold power value. Additionally, or alternatively, the UE 115-*e* may determine a lowest RSRP value of each of the RSRP values associated with each of the sub-slots 410, and the UE 115-*e* may determine that the slot 405 is unavailable based on the lowest RSRP value being above a threshold power value.

In some cases, such as in cases in which transport block repetition is used across all sub-slots 410 and a sub-slot has no DMRS, the UE 115-*e* may determine whether the slot 405 is available or unavailable based on RSRP values associated with the PSCCH of the slot 405. That is, if one or more of the sub-slots 410 do not have DMRS, the UE 115-*e* may use an RSRP value corresponding to the PSCCH of the slot 405 instead of an RSRP values corresponding to a DMRS of the one or more sub-slots 410 for performing functions to determine if slot 405 is available or unavailable. For example, if the sub-slot 410-*c* and the sub-slot 410-*d* do not have an associated DMRS, the UE 115-*e* may use the RSRP associated with the PSCCH of the slot 405 in procedures to determine the availability of the sub-slot 410-*c*, and the sub-slot 410-*d*, and the slot 405.

In some examples, such as when the slot 405 is of a format that supports transmission and reception during the slot 405 (e.g., Format 1), the determination of whether the slot 405 or a sub-slot 410 is available may be based on whether the UE 115-*e* is receiving, transmitting, or both. That is, combining functions, rules, or conditions for determining whether the slot 405 is available. For example, the UE 115-*e* may use different threshold power values depending on whether the UE 115-*e* is receiving, transmitting, or both, during the slot 405 or during each individual sub-slot 410. Similarly, the combining functions, rules, or conditions for determining whether the slot 405 is available may be different based on whether each of the sub-slots 410 of the slot 405 are using a same transport block or different transport blocks.

In some examples, such as in transport block repetition cases, the UE 115-*e* may use a portion of the sub-slots 410 for the functions, rules, or conditions described herein to determine whether the slot 405 is available. For example, the UE 115-*e* may be configured to perform a computation based on a configured quantity of sub-slots 410. That is, in some cases, the UE 115-*e* may use RSRP values associated with the first two sub-slots (e.g., sub-slot 410-*a* and sub-slot 410-*b*) to determine whether the slot 410 is available. By measuring some of the sub-slots 410 in the determining, the UE 115-*e* may reduce a quantity of computations performed, which may reduce power consumption and improve processing speed.

In some examples, the UE 115-*g* may send different transport blocks across one or more of the sub-slots 410. For example, the UE 115-*g* may send a first transport block across the sub-slot 410-*a* and the sub-slot 410-*b*, and may send a second transport block (e.g., which may be a repetition of the first transport block) across the sub-slot 410-*c* and the sub-slot 410-*d*. The UE 115-*e* may determine the utilization of each sub-slot 410 of the slot 405 (e.g., based on a received SCI), and may determine the availability of the slot 405 based on the determined utilization. For example, the UE 115-*e* may determine the RSRP values for each sub-slot, and then perform a combining function (e.g., a sum, mean, or AND function) across each mini-slot corresponding to each transport block. Based on the example above, the UE 115-*e* may use a first combining function to combine the RSRP values corresponding to the sub-slot 410-*a* and the sub-slot 410-*b*, and a second combining function to combine the RSRP values corresponding to the sub-slot 410-*c* and the sub-slot 410-*d*. Then, the UE 115-*e* may use a third combining function to combine the results of the first combining function and the second combining function. The first, second, and third combining functions may be a same combining function, or they may be different combining functions.

The UE 115-*e* may determine that the slot 405 is unavailable and refrain from including the slot 405 in the resource availability report. Instead, the UE 115-*e* may determine other slots 405 that are available and include them in the resource availability report. In some examples, the UE 115-*e* may indicate individual sub-slots 410 that are available in the resource availability report (e.g., in addition to or instead of slots 405). The UE 115-*e* may then transmit an IUC message 425 to the UE 115-*f* that indicates the resource availability report. In some cases, the UE 115-*e* may limit the size of the resource availability report based on an indication of a report size (e.g., if included in the IUC request 420). In some examples, the UE 115-*e* may include information related to the RSRP of each sub-slot 410 in the IUC message 425 (e.g., if requested in the IUC request 420). The UE 115-*e* may rank the slots 405 (e.g., or sub-slots 410) included in the resource availability report based on a priority of the sub-slots 410 associated with the UE 115-*f* (e.g., if priority information was received in the IUC request 420 or another message). Accordingly, the UE 115-*f* may perform sidelink communications based on resource sensing performed by the UE 115-*e*.

Figure 5:
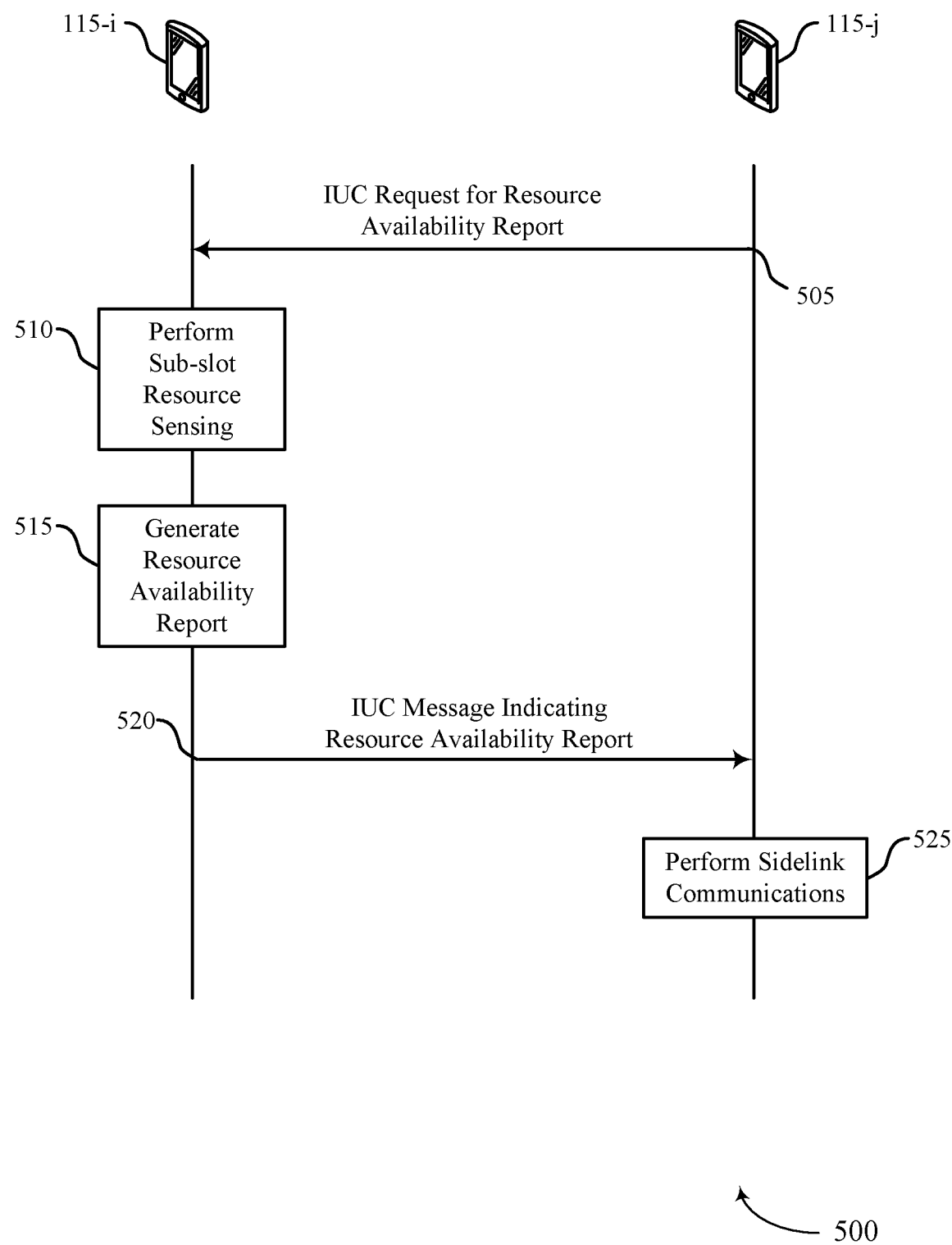
FIG. 5 illustrates an example of a process flow that supports considerations on channel sensing for sidelink in accordance with one or more aspects of the present disclosure.

FIG. 5 illustrates an example of a process flow 500 that supports considerations on channel sensing for sidelink in accordance with one or more aspects of the present disclosure. The process flow 500 may be implemented in a wireless communications system 100, a wireless communications system 300, or a wireless communications systems 400, as described herein with reference to FIGS. 1, 3, and 4. The process flow 500 may include a UE 115-*i* and a UE 115-*j*, which may be examples of UEs 115 as described herein, with reference to FIGS. 1 through 4. In the following descriptions of the process flow 500, the operations performed by the devices may be performed in different orders or at different times. Additionally, or alternatively, some operations may be omitted from the process flow 500, and other operations may be added to the process flow 500.

At 505, the UE 115-*j* may transmit an IUC request that requests a resource availability report from the UE 115-*i*. In some examples, the IUC request may be transmitted by the UE 115-*j* per sub-slot, bundle of sub-slots, slot, transport block, or a combination thereof. The IUC request may be transmitted in a resource that is reserved for IUC requests (e.g., a dedicated resource). In some examples, the IUC request may include an indication of a type of resource availability report. For example, the IUC request may indicate a report size, which may limit the quantity of slots or sub-slots to be included in the resource availability report. In some cases, the UE 115-*j* may indicate one or more priorities associated with one or more sub-slots in the IUC request. In some examples, the IUC request may request soft information associated with one or more sub-slots. For example, the IUC request may request that the UE 115-*e* reports RSRP values associated with the one or more sub-slots (e.g., in the resource availability report).

At 510, the UE 115-*i* may perform resource sensing according to individual sub-slots, as described herein with reference to FIGS. 3 and 4. For example, the UE 115-*i* may measure one or more DMRSs associated with multiple sub-slots within a slot, and the UE 115-*i* may determine that a slot is available based on RSRP measurements corresponding to multiple sub-slots within the slot. In some cases, the UE 115-*i* may measure a first two sub-slots of a slot (e.g., a first sub-slot that begins at a start time of the slot, and a second sub-slot adjacent to the first sub-slot in the time domain). In some examples, the UE 115-*i* may determine one or more slots to be available based on a plurality of measurements associated with multiple sub-slots.

At 515, the UE 115-*i* may generate the resource availability report based on the resource sensing. For example, the UE 115-*i* may include one or more slots that the UE 115-*i* determined were available. In some examples, generating the resource availability report may be based on the RSRP measurements performed by the UE 115-*i* satisfying a threshold. For example, the UE 115-*i* may include a slot in the resource availability report if a sum, a mean, or each of RSRP measurements corresponding to the multiple sub-slots of the slot are below a threshold power value. In some cases, generating the resource availability report may be based on a highest or a lowest RSRP measurement corresponding to the multiple sub-slots. In some examples, the UE 115-*i* may indicate individual sub-slots that are available in the resource availability report (e.g., in addition to or instead of slots).

At 520, the UE 115-*i* may transmit an IUC message indicating the resource availability report to the UE 115-*j*. In some cases, the UE 115-*e* may limit the size of the resource availability report based on an indication of a report size (e.g., if included in the IUC request 420). In some examples, the UE 115-*e* may include information related to the RSRP of each sub-slot 410 in the IUC message 425 (e.g., if requested in the IUC request 420). The UE 115-*e* may rank the slots 405 (e.g., or sub-slots 410) included in the resource availability report based on a priority of the sub-slots 410 associated with the UE 115-*f* (e.g., if priority information was received in the IUC request 420 or another message).

At 525, the UE 115-*j* may perform sidelink communications according to the received resource availability report. For example, the UE 115-*j* may perform a transmission in a slot or sub-slot indicated in the resource availability report.

Figure 6:
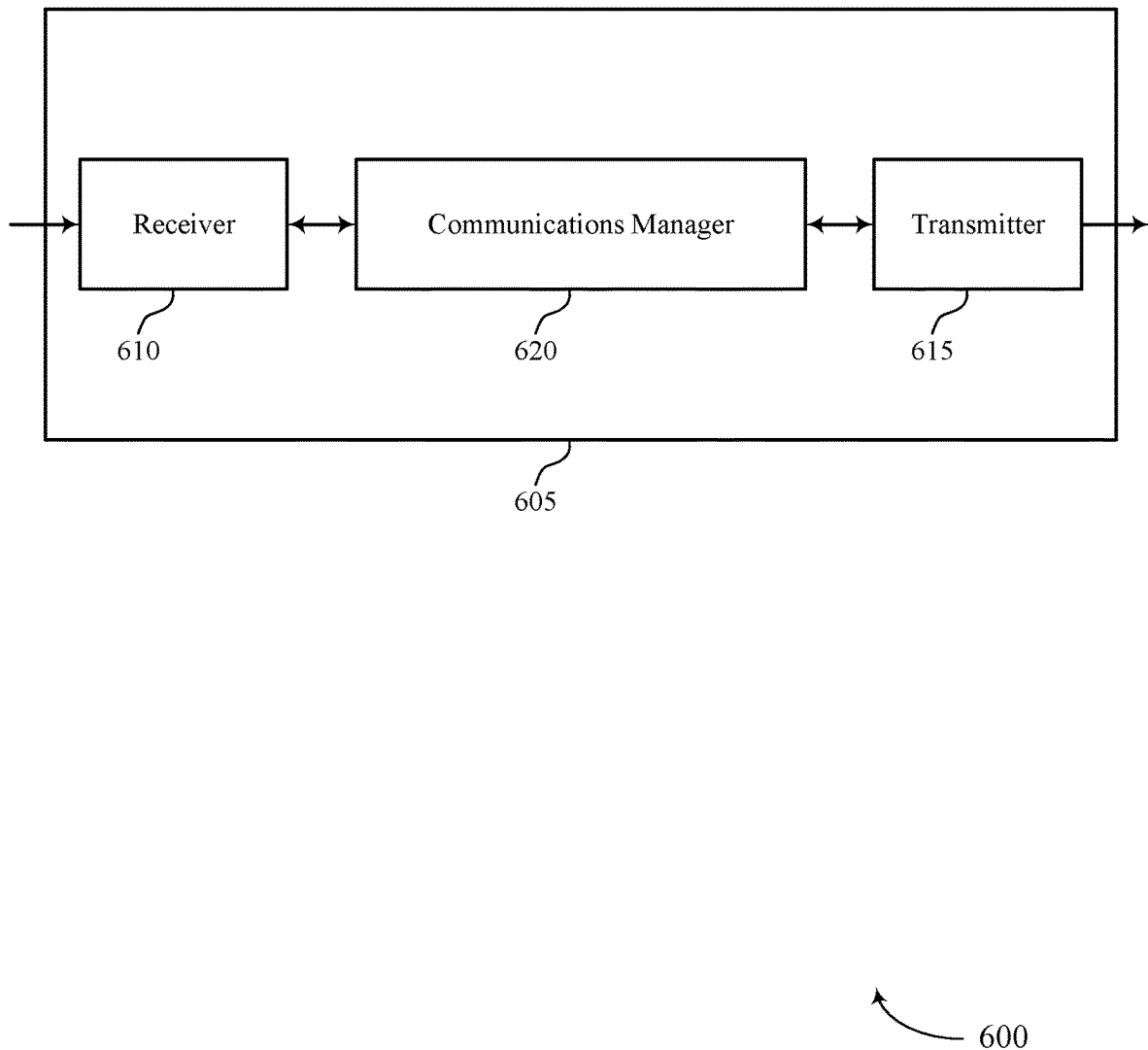
FIGS. 6 and 7 illustrate block diagrams of devices that support considerations on channel sensing for sidelink in accordance with one or more aspects of the present disclosure.

FIG. 6 illustrates a block diagram 600 of a device 605 that supports considerations on channel sensing for sidelink in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to considerations on channel sensing for sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to considerations on channel sensing for sidelink). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of considerations on channel sensing for sidelink as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first UE in accordance with examples as disclosed herein. For example, the communications manager 620 may be configured as or otherwise support a means for receiving, from a second UE, an IUC request that requests a resource availability report from the first UE. The communications manager 620 may be configured as or otherwise support a means for generating, in response to the IUC request, the resource availability report indicating at least one slot that is available based on one or more measurements associated with a set of multiple sub-slots within the at least one slot. The communications manager 620 may be configured as or otherwise support a means for transmitting, to the second UE in response to the IUC request, an IUC message that indicates the resource availability report.

Additionally, or alternatively, the communications manager 620 may support wireless communication at a second UE in accordance with examples as disclosed herein. For example, the communications manager 620 may be configured as or otherwise support a means for transmitting, to a first UE, an IUC request that requests a resource availability report from the first UE. The communications manager 620 may be configured as or otherwise support a means for receiving, in response to the IUC request, an IUC message that indicates the resource availability report indicating at least one slot that is available based on one or more measurements associated with a set of multiple sub-slots within the at least one slot.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for resource sensing for sidelink communications using reduced processing, reduced power consumption, and more efficient utilization of communication resources by sharing sensing information.

Figure 7:
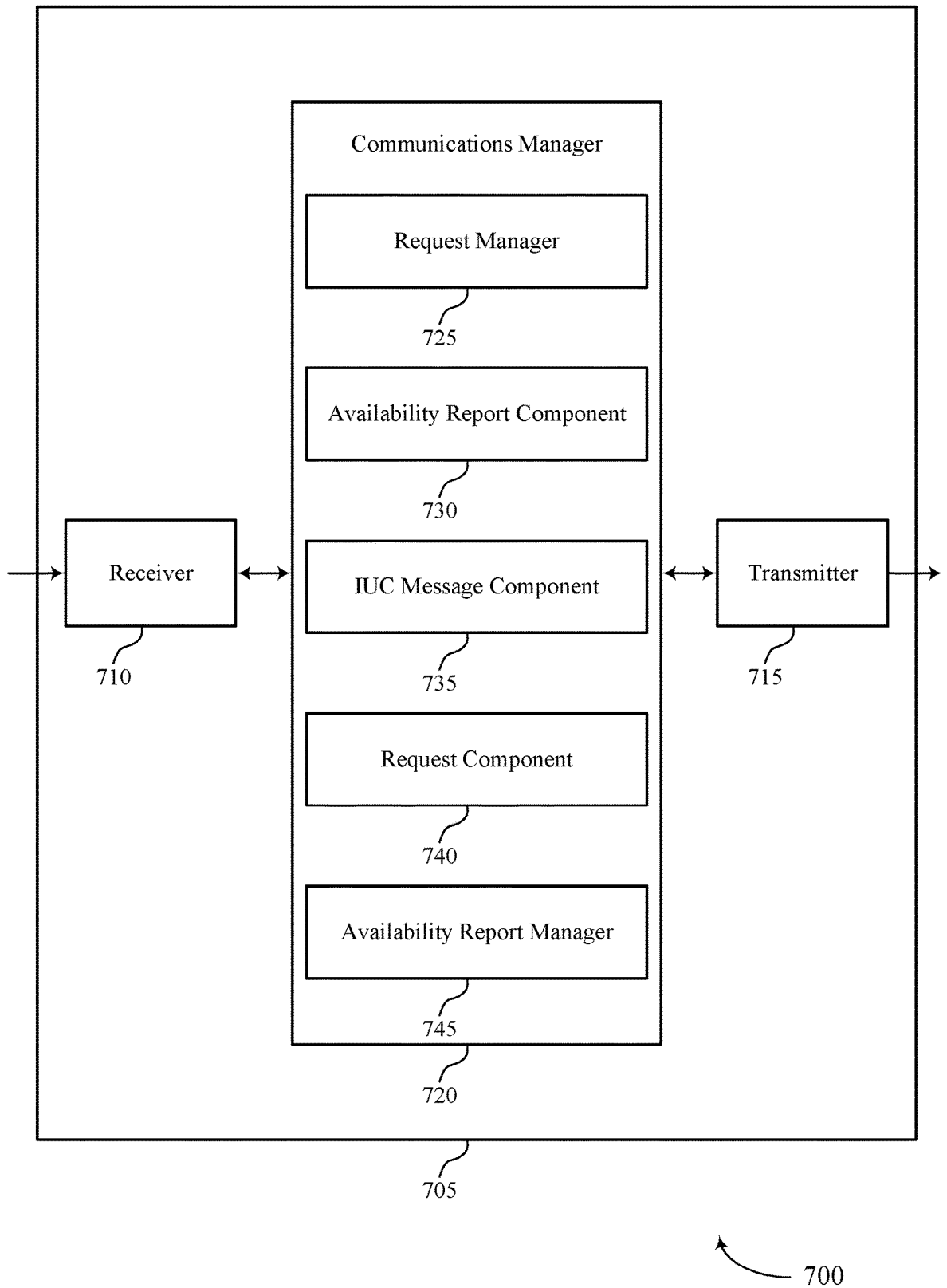

FIG. 7 illustrates a block diagram 700 of a device 705 that supports considerations on channel sensing for sidelink in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to considerations on channel sensing for sidelink). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to considerations on channel sensing for sidelink). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of considerations on channel sensing for sidelink as described herein. For example, the communications manager 720 may include a request manager 725, an availability report component 730, an IUC message component 735, a request component 740, an availability report manager 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first UE in accordance with examples as disclosed herein. The request manager 725 may be configured as or otherwise support a means for receiving, from a second UE, an IUC request that requests a resource availability report from the first UE. The availability report component 730 may be configured as or otherwise support a means for generating, in response to the IUC request, the resource availability report indicating at least one slot that is available based on one or more measurements associated with a set of multiple sub-slots within the at least one slot. The IUC message component 735 may be configured as or otherwise support a means for transmitting, to the second UE in response to the IUC request, an IUC message that indicates the resource availability report.

Additionally, or alternatively, the communications manager 720 may support wireless communication at a second UE in accordance with examples as disclosed herein. The request component 740 may be configured as or otherwise support a means for transmitting, to a first UE, an IUC request that requests a resource availability report from the first UE. The availability report manager 745 may be configured as or otherwise support a means for receiving, in response to the IUC request, an IUC message that indicates the resource availability report indicating at least one slot that is available based on one or more measurements associated with a set of multiple sub-slots within the at least one slot.

Figure 8:
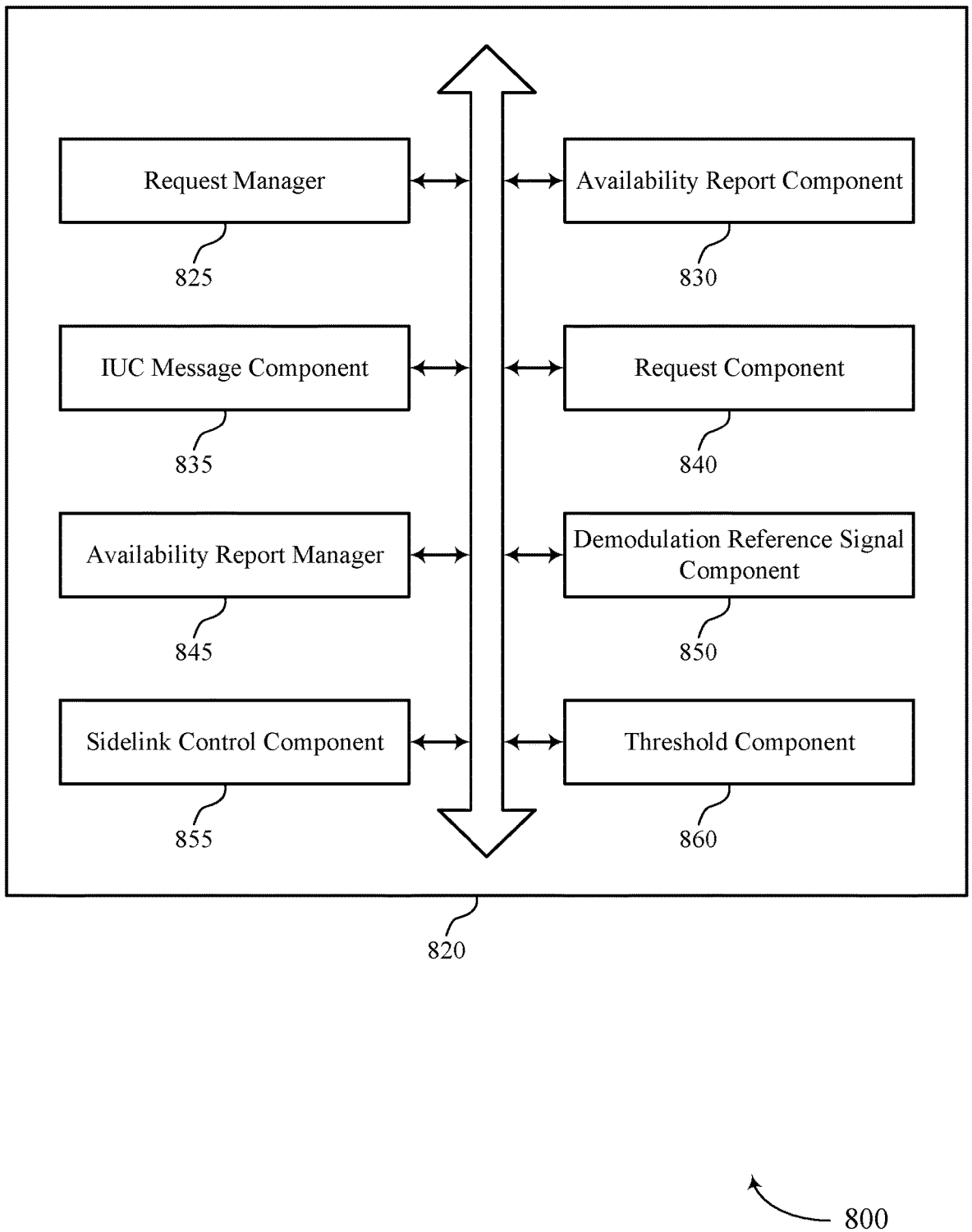
FIG. 8 illustrates a block diagram of a communications manager that supports considerations on channel sensing for sidelink in accordance with one or more aspects of the present disclosure.

FIG. 8 illustrates a block diagram 800 of a communications manager 820 that supports considerations on channel sensing for sidelink in accordance with one or more aspects of the present disclosure. The communications manager 820 may be an example of aspects of a communications manager 620, a communications manager 720, or both, as described herein. The communications manager 820, or various components thereof, may be an example of means for performing various aspects of considerations on channel sensing for sidelink as described herein. For example, the communications manager 820 may include a request manager 825, an availability report component 830, an IUC message component 835, a request component 840, an availability report manager 845, a DMRS component 850, a sidelink control component 855, a threshold component 860, or any combination thereof. Each of these components may communicate, directly or indirectly, with one another (e.g., via one or more buses).

The communications manager 820 may support wireless communication at a first UE in accordance with examples as disclosed herein. The request manager 825 may be configured as or otherwise support a means for receiving, from a second UE, an IUC request that requests a resource availability report from the first UE. The availability report component 830 may be configured as or otherwise support a means for generating, in response to the IUC request, the resource availability report indicating at least one slot that is available based on one or more measurements associated with a set of multiple sub-slots within the at least one slot. The IUC message component 835 may be configured as or otherwise support a means for transmitting, to the second UE in response to the IUC request, an IUC message that indicates the resource availability report.

In some examples, the DMRS component 850 may be configured as or otherwise support a means for measuring a DMRS associated with each of the set of multiple sub-slots within the at least one slot to obtain one or more received power measurements, where the one or more measurements include the one or more received power measurements.

In some examples, to support generating the resource availability report, the threshold component 860 may be configured as or otherwise support a means for generating the resource availability report based on each of the one or more received power measurements being below a threshold power measurement.

In some examples, to support generating the resource availability report, the threshold component 860 may be configured as or otherwise support a means for generating the resource availability report based on a sum of each of the one or more received power measurements being below a threshold power measurement.

In some examples, to support generating the resource availability report, the threshold component 860 may be configured as or otherwise support a means for generating the resource availability report based on a mean of each of the one or more received power measurements being below a threshold power measurement.

In some examples, to support generating the resource availability report, the DMRS component 850 may be configured as or otherwise support a means for measuring a DMRS associated with each of the set of multiple sub-slots within the at least one slot to obtain one or more received power measurements. In some examples, to support generating the resource availability report, the availability report component 830 may be configured as or otherwise support a means for generating, in response to the IUC request, the resource availability report indicating the at least one slot that is available based on a lowest received power measurement of the one or more received power measurements.

In some examples, to support generating the resource availability report, the DMRS component 850 may be configured as or otherwise support a means for measuring a DMRS associated with each of the set of multiple sub-slots within the at least one slot to obtain one or more received power measurements. In some examples, to support generating the resource availability report, the availability report component 830 may be configured as or otherwise support a means for generating, in response to the IUC request, the resource availability report indicating the at least one slot that is available based on a highest received power measurement of the one or more received power measurements.

In some examples, the set of multiple sub-slots within the at least one slot include a first sub-slot that begins at a start time of the at least one slot and a second sub-slot adjacent to the first sub-slot in a time domain.

In some examples, the sidelink control component 855 may be configured as or otherwise support a means for receiving a sidelink control transmission, where the one or more measurements include one or more received power measurements associated with the sidelink control transmission.

In some examples, to support receiving the IUC request, the request manager 825 may be configured as or otherwise support a means for receiving, from the second UE, an IUC request that requests a resource availability report associated with one or more sub-slots from the first UE.

In some examples, the IUC request indicates a quantity of slots associated with the resource availability report.

In some examples, the IUC request indicates a priority associated with each of the set of multiple sub-slots.

Additionally, or alternatively, the communications manager 820 may support wireless communication at a second UE in accordance with examples as disclosed herein. The request component 840 may be configured as or otherwise support a means for transmitting, to a first UE, an IUC request that requests a resource availability report from the first UE. The availability report manager 845 may be configured as or otherwise support a means for receiving, in response to the IUC request, an IUC message that indicates the resource availability report indicating at least one slot that is available based on one or more measurements associated with a set of multiple sub-slots within the at least one slot.

In some examples, the one or more measurements include one or more received power measurements associated with each of the set of multiple sub-slots within the at least one slot.

In some examples, to support receiving the IUC message, the threshold component 860 may be configured as or otherwise support a means for receiving the IUC message that indicates the resource availability report based on each of the one or more received power measurements being below a threshold power measurement.

In some examples, to support receiving the IUC message, the threshold component 860 may be configured as or otherwise support a means for receiving the IUC message that indicates the resource availability report based on a sum of each of the one or more received power measurements being below a threshold power measurement.

In some examples, to support receiving the IUC message, the threshold component 860 may be configured as or otherwise support a means for receiving the IUC message that indicates the resource availability report based on a mean of each of the one or more received power measurements being below a threshold power measurement.

In some examples, the one or more measurements include one or more received power measurements and, to support receiving the IUC message, the availability report component 830 may be configured as or otherwise support a means for receiving the IUC message that indicates the resource availability report based on a lowest received power measurement of the one or more received power measurements.

In some examples, the one or more measurements include one or more received power measurements and, to support receiving the IUC message, the availability report component 830 may be configured as or otherwise support a means for receiving the IUC message that indicates the resource availability report based on a highest received power measurement of the one or more received power measurements.

In some examples, the set of multiple sub-slots within the at least one slot include a first sub-slot that begins at a start time of the at least one slot and a second sub-slot adjacent to the first sub-slot in a time domain.

In some examples, the one or more measurements include one or more received power measurements associated with a sidelink control transmission.

In some examples, to support transmitting the IUC request, the request manager 825 may be configured as or otherwise support a means for transmitting, to the first UE, an IUC request that requests a resource availability report associated with one or more sub-slots from the first UE.

In some examples, to support transmitting the IUC request, the request manager 825 may be configured as or otherwise support a means for transmitting, to the first UE, the IUC request that requests the resource availability report from the first UE, the IUC request indicating a quantity of slots associated with the resource availability report.

In some examples, to support transmitting the IUC request, the request manager 825 may be configured as or otherwise support a means for transmitting, to the first UE, the IUC request that requests the resource availability report from the first UE, the IUC request indicating a priority associated with each of the set of multiple sub-slots within the at least one slot.

Figure 9:
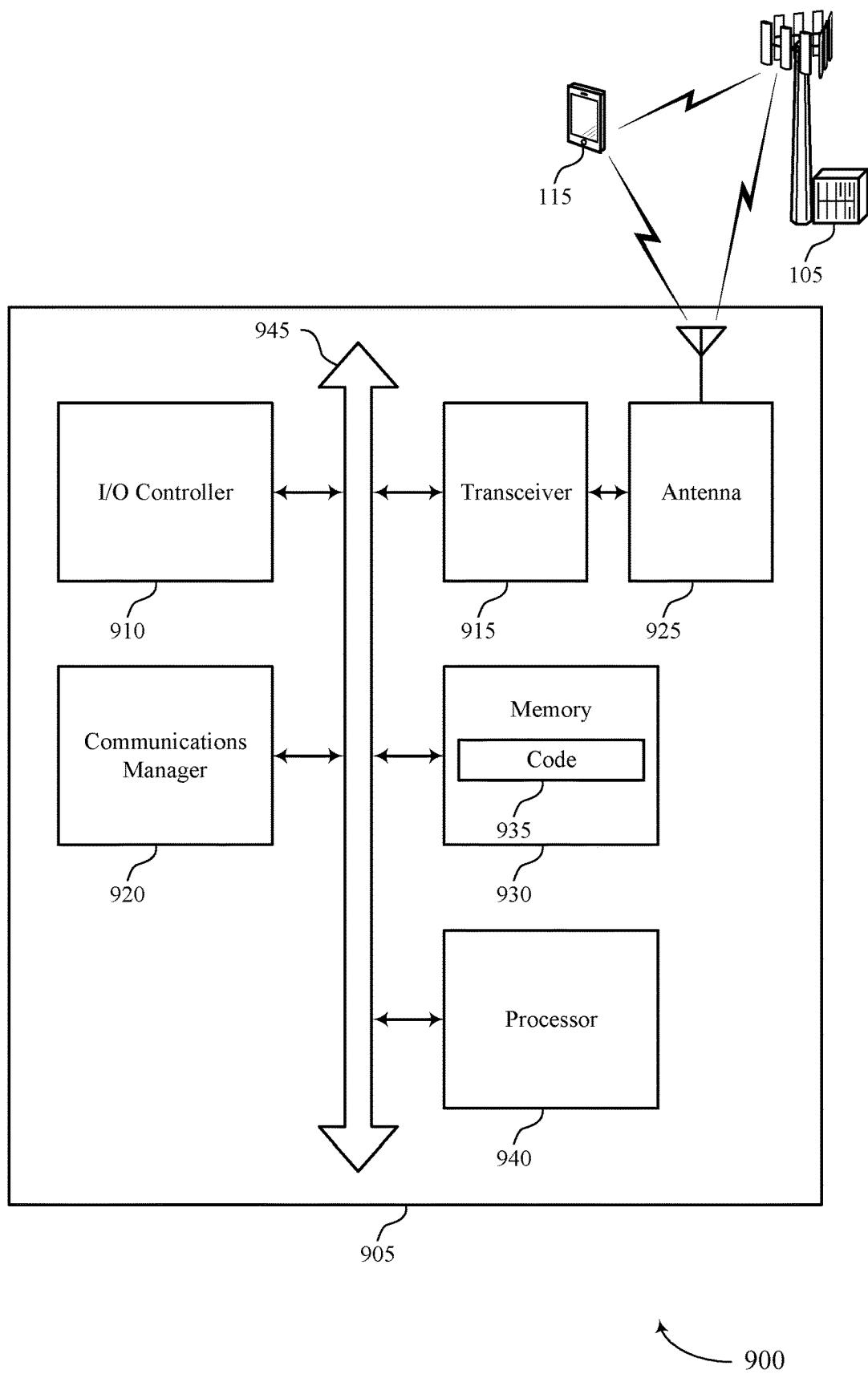
FIG. 9 illustrates a diagram of a system including a device that supports considerations on channel sensing for sidelink in accordance with one or more aspects of the present disclosure.

FIG. 9 illustrates a diagram of a system 900 including a device 905 that supports considerations on channel sensing for sidelink in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting considerations on channel sensing for sidelink). For example, the device 905 or a component of the device 905 may include a processor 940 and memory 930 coupled with or to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for receiving, from a second UE, an IUC request that requests a resource availability report from the first UE. The communications manager 920 may be configured as or otherwise support a means for generating, in response to the IUC request, the resource availability report indicating at least one slot that is available based on one or more measurements associated with a set of multiple sub-slots within the at least one slot. The communications manager 920 may be configured as or otherwise support a means for transmitting, to the second UE in response to the IUC request, an IUC message that indicates the resource availability report.

Additionally, or alternatively, the communications manager 920 may support wireless communication at a second UE in accordance with examples as disclosed herein. For example, the communications manager 920 may be configured as or otherwise support a means for transmitting, to a first UE, an IUC request that requests a resource availability report from the first UE. The communications manager 920 may be configured as or otherwise support a means for receiving, in response to the IUC request, an IUC message that indicates the resource availability report indicating at least one slot that is available based on one or more measurements associated with a set of multiple sub-slots within the at least one slot.

By including or configuring the communications manager 920 in accordance with examples as described herein, the device 905 may support techniques for resource sensing for sidelink communications with improved communication reliability, improved user experience related to reduced processing, reduced power consumption, and more efficient utilization of communication resources by sharing sensing information.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of considerations on channel sensing for sidelink as described herein, or the processor 940 and the memory 930 may be otherwise configured to perform or support such operations.

Figure 10:
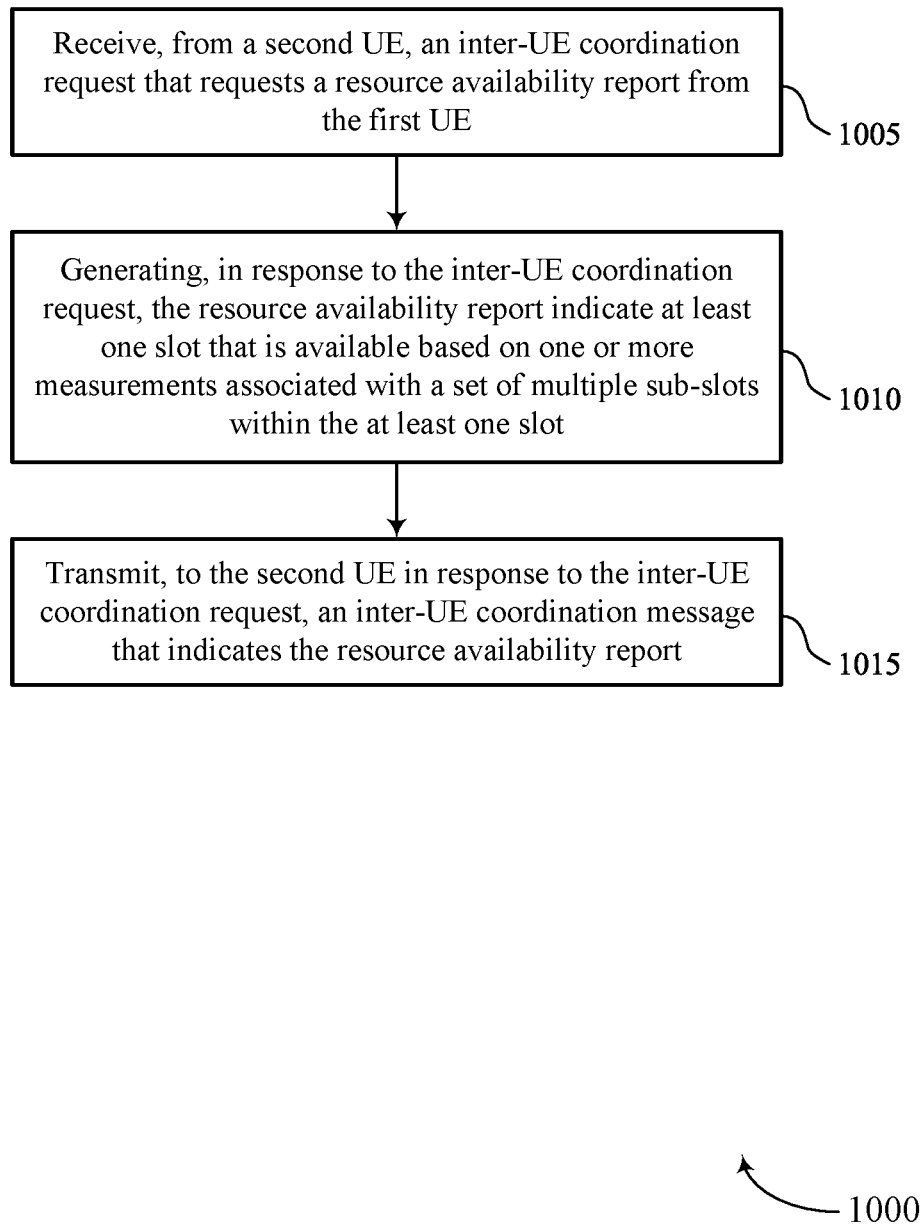
FIGS. 10 through 14 illustrate flowcharts showing methods that support considerations on channel sensing for sidelink in accordance with one or more aspects of the present disclosure.

FIG. 10 illustrates a flowchart illustrating a method 1000 that supports considerations on channel sensing for sidelink in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving, from a second UE, an IUC request that requests a resource availability report from the first UE. The operations of 1005 may be performed in accordance with examples as disclosed herein. In some examples, aspects of the operations of 1005 may be performed by a request manager 825 as described with reference to FIG. 8.

At 1010, the method may include generating, in response to the IUC request, the resource availability report indicating at least one slot that is available based on one or more measurements associated with a set of multiple sub-slots within the at least one slot. The operations of 1010 may be performed in accordance with examples as disclosed herein. In some examples, aspects of the operations of 1010 may be performed by an availability report component 830 as described with reference to FIG. 8.

At 1015, the method may include transmitting, to the second UE in response to the IUC request, an IUC message that indicates the resource availability report. The operations of 1015 may be performed in accordance with examples as disclosed herein. In some examples, aspects of the operations of 1015 may be performed by an IUC message component 835 as described with reference to FIG. 8.

Figure 11:
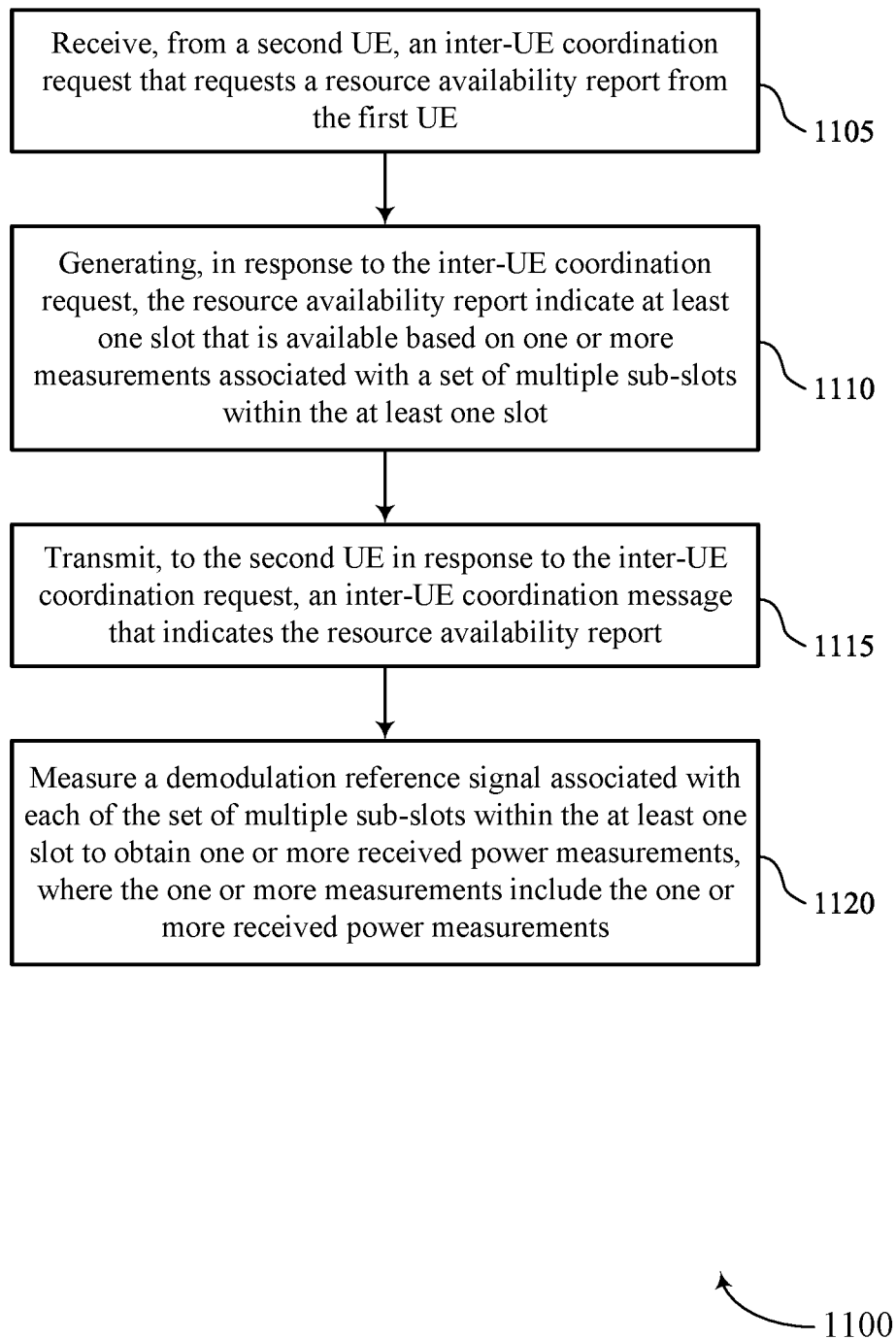

FIG. 11 illustrates a flowchart illustrating a method 1100 that supports considerations on channel sensing for sidelink in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving, from a second UE, an IUC request that requests a resource availability report from the first UE. The operations of 1105 may be performed in accordance with examples as disclosed herein. In some examples, aspects of the operations of 1105 may be performed by a request manager 825 as described with reference to FIG. 8.

At 1110, the method may include generating, in response to the IUC request, the resource availability report indicating at least one slot that is available based on one or more measurements associated with a set of multiple sub-slots within the at least one slot. The operations of 1110 may be performed in accordance with examples as disclosed herein. In some examples, aspects of the operations of 1110 may be performed by an availability report component 830 as described with reference to FIG. 8.

At 1115, the method may include transmitting, to the second UE in response to the IUC request, an IUC message that indicates the resource availability report. The operations of 1115 may be performed in accordance with examples as disclosed herein. In some examples, aspects of the operations of 1115 may be performed by an IUC message component 835 as described with reference to FIG. 8.

At 1120, the method may include measuring a DMRS associated with each of the set of multiple sub-slots within the at least one slot to obtain one or more received power measurements, where the one or more measurements include the one or more received power measurements. The operations of 1120 may be performed in accordance with examples as disclosed herein. In some examples, aspects of the operations of 1120 may be performed by a DMRS component 850 as described with reference to FIG. 8.

Figure 12:
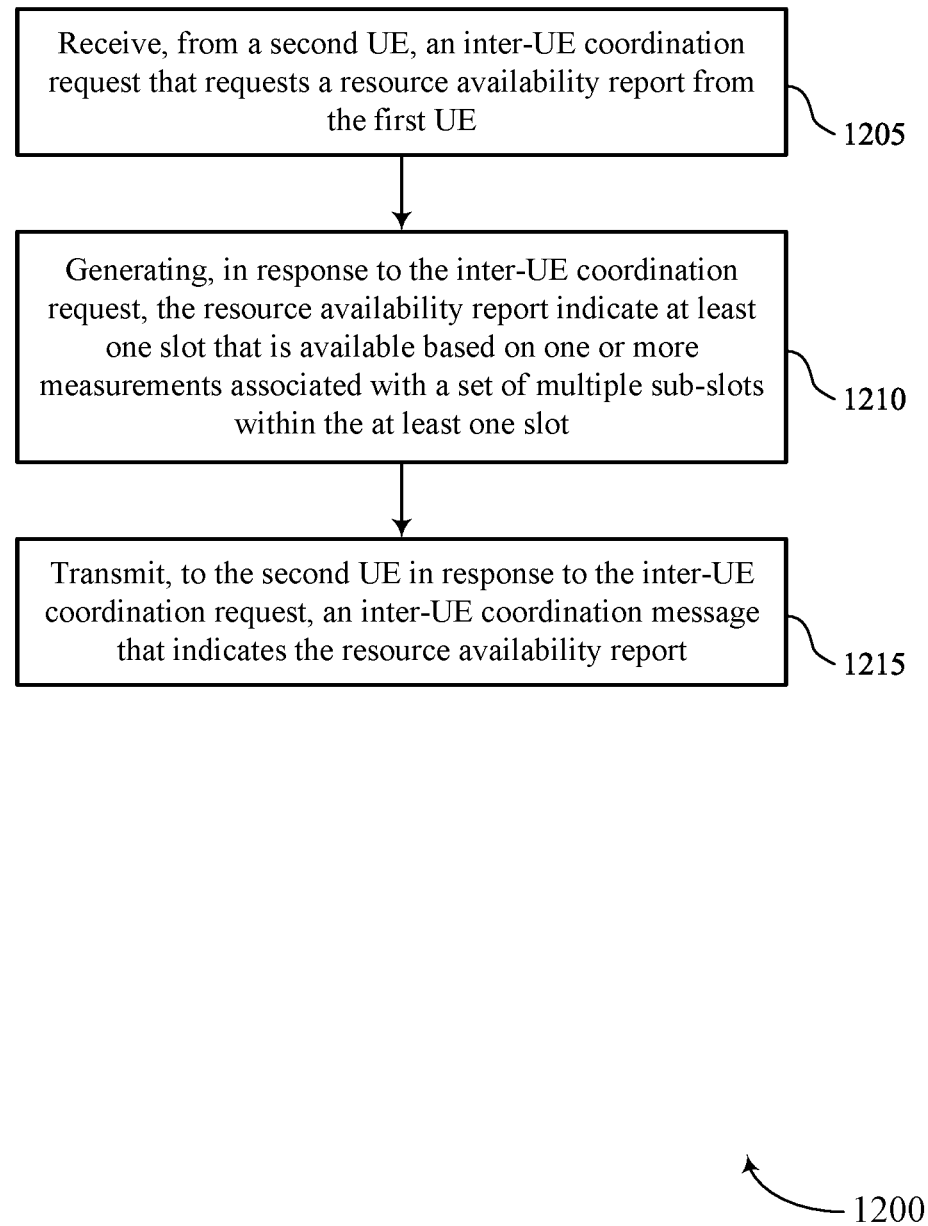

FIG. 12 illustrates a flowchart illustrating a method 1200 that supports considerations on channel sensing for sidelink in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving, from a second UE, an IUC request that requests a resource availability report from the first UE. The operations of 1205 may be performed in accordance with examples as disclosed herein. In some examples, aspects of the operations of 1205 may be performed by a request manager 825 as described with reference to FIG. 8.

At 1210, the method may include generating, in response to the IUC request, the resource availability report indicating at least one slot that is available based on one or more measurements associated with a set of multiple sub-slots within the at least one slot. The operations of 1210 may be performed in accordance with examples as disclosed herein. In some examples, aspects of the operations of 1210 may be performed by an availability report component 830 as described with reference to FIG. 8.

At 1215, the method may include transmitting, to the second UE in response to the IUC request, an IUC message that indicates the resource availability report. The operations of 1215 may be performed in accordance with examples as disclosed herein. In some examples, aspects of the operations of 1215 may be performed by an IUC message component 835 as described with reference to FIG. 8.

Figure 13:
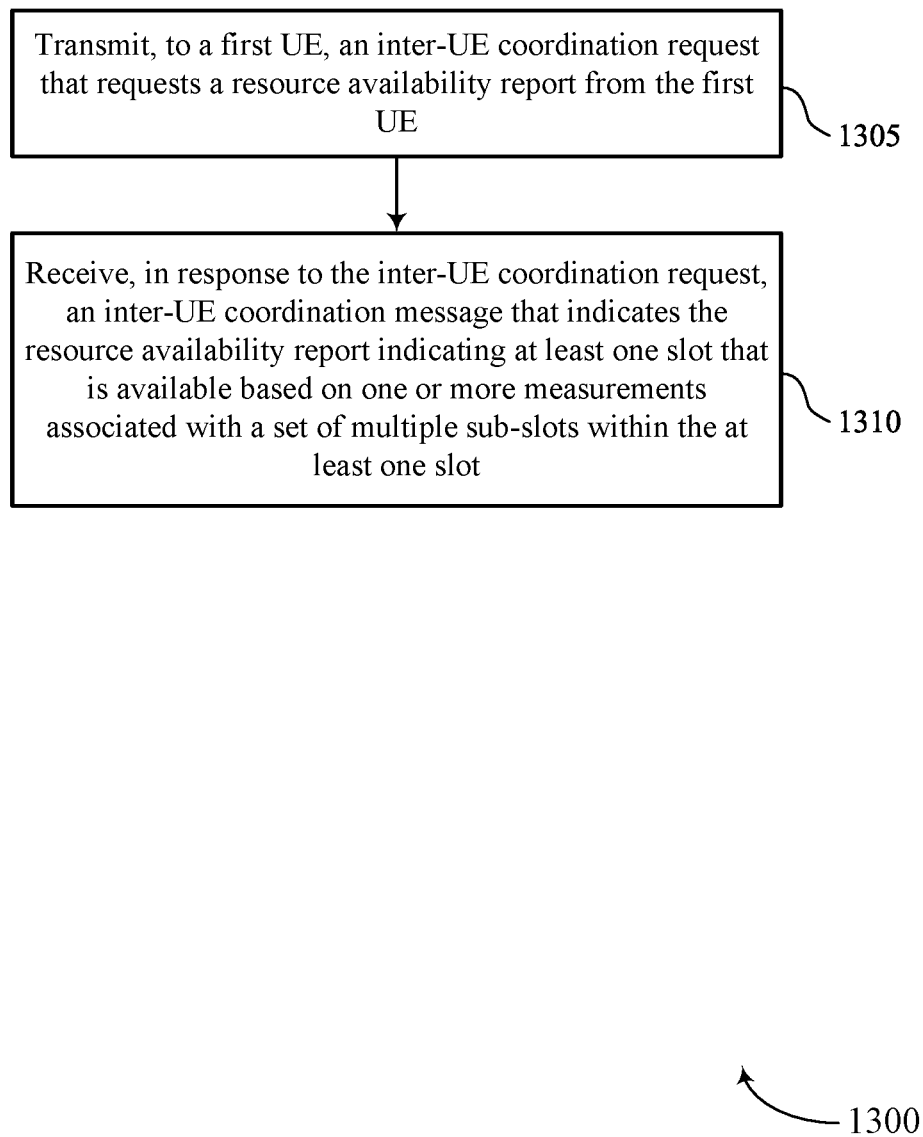

FIG. 13 illustrates a flowchart illustrating a method 1300 that supports considerations on channel sensing for sidelink in accordance with one or more aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include transmitting, to a first UE, an IUC request that requests a resource availability report from the first UE. The operations of 1305 may be performed in accordance with examples as disclosed herein. In some examples, aspects of the operations of 1305 may be performed by a request component 840 as described with reference to FIG. 8.

At 1310, the method may include receiving, in response to the IUC request, an IUC message that indicates the resource availability report indicating at least one slot that is available based on one or more measurements associated with a set of multiple sub-slots within the at least one slot. The operations of 1310 may be performed in accordance with examples as disclosed herein. In some examples, aspects of the operations of 1310 may be performed by an availability report manager 845 as described with reference to FIG. 8.

Figure 14:
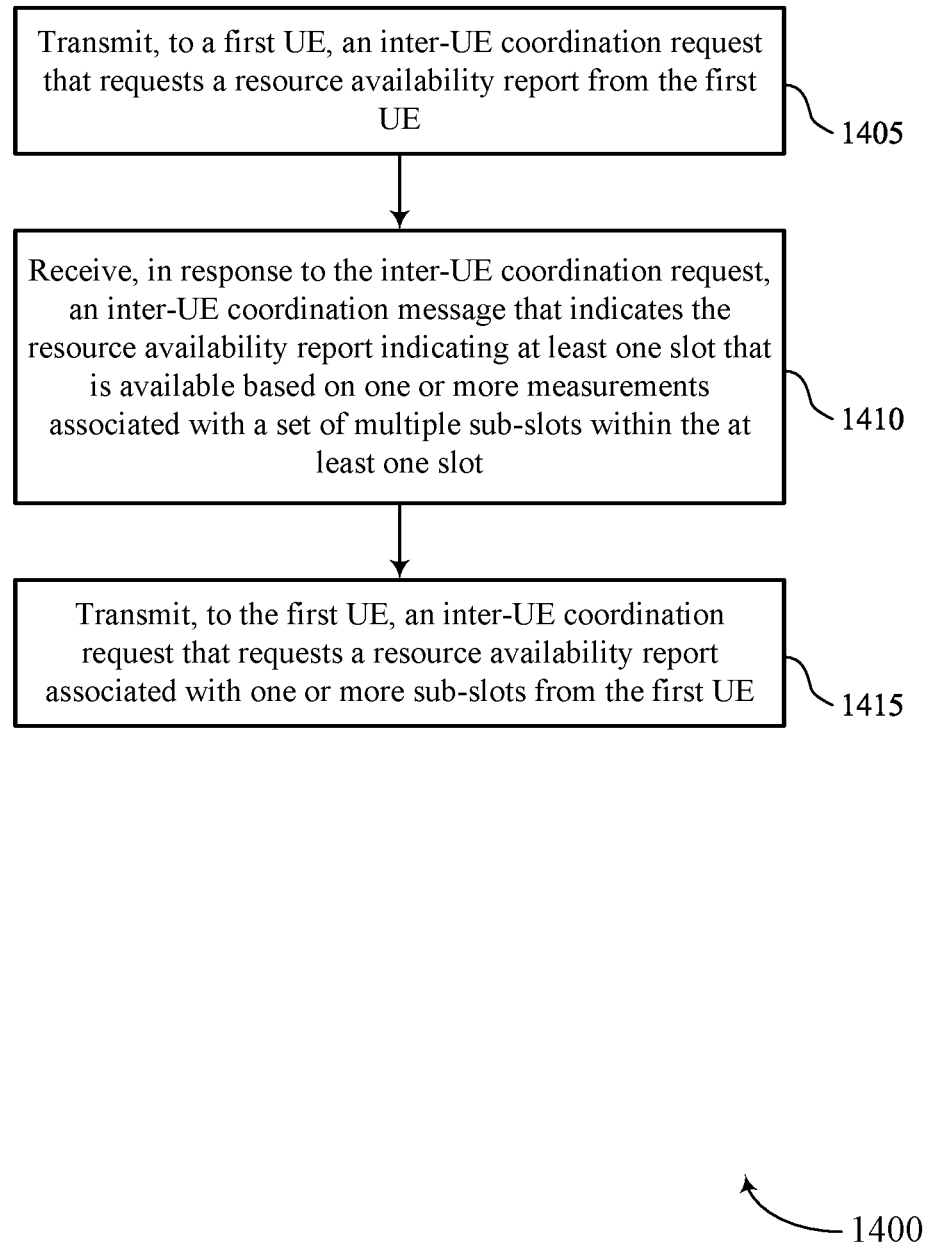

FIG. 14 illustrates a flowchart illustrating a method 1400 that supports considerations on channel sensing for sidelink in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include transmitting, to a first UE, an IUC request that requests a resource availability report from the first UE. The operations of 1405 may be performed in accordance with examples as disclosed herein. In some examples, aspects of the operations of 1405 may be performed by a request component 840 as described with reference to FIG. 8.

At 1410, the method may include receiving, in response to the IUC request, an IUC message that indicates the resource availability report indicating at least one slot that is available based on one or more measurements associated with a set of multiple sub-slots within the at least one slot. The operations of 1410 may be performed in accordance with examples as disclosed herein. In some examples, aspects of the operations of 1410 may be performed by an availability report manager 845 as described with reference to FIG. 8.

At 1415, the method may include transmitting, to the first UE, an IUC request that requests a resource availability report associated with one or more sub-slots from the first UE. The operations of 1415 may be performed in accordance with examples as disclosed herein. In some examples, aspects of the operations of 1415 may be performed by a request manager 825 as described with reference to FIG. 8.

The following provides an overview of aspects of the present disclosure:

Aspect 1: A method for wireless communication at a first UE, comprising: receiving, from a second UE, an IUC request that requests a resource availability report from the first UE; generating, in response to the IUC request, the resource availability report indicating at least one slot that is available based at least in part on one or more measurements associated with a plurality of sub-slots within the at least one slot; and transmitting, to the second UE in response to the IUC request, an IUC message that indicates the resource availability report.

Aspect 2: The method of aspect 1, further comprising measuring a DMRS associated with each of the plurality of sub-slots within the at least one slot to obtain one or more received power measurements, wherein the one or more measurements comprise the one or more received power measurements.

Aspect 3: The method of aspect 2, wherein generating the resource availability report comprises generating the resource availability report based at least in part on each of the one or more received power measurements being below a threshold power measurement.

Aspect 4: The method of aspect 2, wherein generating the resource availability report comprises generating the resource availability report based at least in part on a sum of each of the one or more received power measurements being below a threshold power measurement.

Aspect 5: The method of aspect 2, wherein generating the resource availability report comprises generating the resource availability report based at least in part on a mean of each of the one or more received power measurements being below a threshold power measurement.

Aspect 6: The method of any of aspects 1 through 5, wherein generating the resource availability report comprises: measuring a DMRS associated with each of the plurality of sub-slots within the at least one slot to obtain one or more received power measurements; and generating, in response to the IUC request, the resource availability report indicating the at least one slot that is available based at least in part on a lowest received power measurement of the one or more received power measurements.

Aspect 7: The method of any of aspects 1 through 5, wherein generating the resource availability report comprises: measuring a DMRS associated with each of the plurality of sub-slots within the at least one slot to obtain one or more received power measurements; and generating, in response to the IUC request, the resource availability report indicating the at least one slot that is available based at least in part on a highest received power measurement of the one or more received power measurements.

Aspect 8: The method of any of aspects 1 through 7, wherein the plurality of sub-slots within the at least one slot comprise a first sub-slot that begins at a start time of the at least one slot and a second sub-slot adjacent to the first sub-slot in a time domain.

Aspect 9: The method of any of aspects 1 through 8, further comprising: receiving a sidelink control transmission, wherein the one or more measurements comprise one or more received power measurements associated with the sidelink control transmission.

Aspect 10: The method of any of aspects 1 through 9, wherein receiving the IUC request comprises: receiving, from the second UE, an IUC request that requests a resource availability report associated with one or more sub-slots from the first UE.

Aspect 11: The method of any of aspects 1 through 10, wherein the IUC request indicates a quantity of slots associated with the resource availability report.

Aspect 12: The method of any of aspects 1 through 11, wherein the IUC request indicates a priority associated with each of the plurality of sub-slots.

Aspect 13: A method for wireless communication at a second UE, comprising: transmitting, to a first UE, an IUC request that requests a resource availability report from the first UE; receiving, in response to the IUC request, an IUC message that indicates the resource availability report indicating at least one slot that is available based at least in part on one or more measurements associated with a plurality of sub-slots within the at least one slot.

Aspect 14: The method of aspect 13, wherein the one or more measurements comprise one or more received power measurements associated with each of the plurality of sub-slots within the at least one slot.

Aspect 15: The method of aspect 14, wherein receiving the IUC message comprises receiving the IUC message that indicates the resource availability report based at least in part on each of the one or more received power measurements being below a threshold power measurement.

Aspect 16: The method of aspect 14, wherein receiving the IUC message comprises receiving the IUC message that indicates the resource availability report based at least in part on a sum of each of the one or more received power measurements being below a threshold power measurement.

Aspect 17: The method of aspect 14, wherein receiving the IUC message comprises receiving the IUC message that indicates the resource availability report based at least in part on a mean of each of the one or more received power measurements being below a threshold power measurement.

Aspect 18: The method of any of aspects 13 through 17, wherein the one or more measurements comprise one or more received power measurements, and receiving the IUC message comprises: receiving the IUC message that indicates the resource availability report based at least in part on a lowest received power measurement of the one or more received power measurements.

Aspect 19: The method of any of aspects 13 through 17, wherein the one or more measurements comprise one or more received power measurements, and receiving the IUC message comprises: receiving the IUC message that indicates the resource availability report based at least in part on a highest received power measurement of the one or more received power measurements.

Aspect 20: The method of any of aspects 13 through 19, wherein the plurality of sub-slots within the at least one slot comprise a first sub-slot that begins at a start time of the at least one slot and a second sub-slot adjacent to the first sub-slot in a time domain.

Aspect 21: The method of any of aspects 13 through 20, wherein the one or more measurements comprise one or more received power measurements associated with a sidelink control transmission.

Aspect 22: The method of any of aspects 13 through 21, wherein transmitting the IUC request comprises: transmitting, to the first UE, an IUC request that requests a resource availability report associated with one or more sub-slots from the first UE.

Aspect 23: The method of any of aspects 13 through 22, wherein transmitting the IUC request comprises: transmitting, to the first UE, the IUC request that requests the resource availability report from the first UE, the IUC request indicating a quantity of slots associated with the resource availability report.

Aspect 24: The method of any of aspects 13 through 23, wherein transmitting the IUC request comprises: transmitting, to the first UE, the IUC request that requests the resource availability report from the first UE, the IUC request indicating a priority associated with each of the plurality of sub-slots within the at least one slot.

Aspect 25: An apparatus for wireless communication at a first UE, comprising a processor; memory coupled with the processor; and instructions stored in the memory and executable by the processor to cause the apparatus to perform a method of any of aspects 1 through 12.

Aspect 26: An apparatus for wireless communication at a first UE, comprising at least one means for performing a method of any of aspects 1 through 12.

Aspect 27: A non-transitory computer-readable medium storing code for wireless communication at a first UE, the code comprising instructions executable by a processor to perform a method of any of aspects 1 through 12.

Aspect 28: An apparatus for wireless communication at a second UE, comprising a processor; memory coupled with the processor; and instructions stored in the memory and executable by the processor to cause the apparatus to perform a method of any of aspects 13 through 24.

Aspect 29: An apparatus for wireless communication at a second UE, comprising at least one means for performing a method of any of aspects 13 through 24.

Aspect 30: A non-transitory computer-readable medium storing code for wireless communication at a second UE, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving, from a second UE, an inter-UE coordination request that requests a resource availability report from the first UE;
   generating, in response to the inter-UE coordination request, the resource availability report indicating at least one slot that is available based at least in part on one or more measurements of one or more sub-slots of a plurality of sub-slots within the at least one slot; and
   transmitting, to the second UE in response to the inter-UE coordination request, an inter-UE coordination message that indicates the resource availability report.

2. The method of claim 1, further comprising:
   measuring a demodulation reference signal associated with each of the plurality of sub-slots within the at least one slot to obtain one or more received power measurements, wherein the one or more measurements comprise the one or more received power measurements.

3. The method of claim 2, wherein generating the resource availability report comprises:
   generating the resource availability report based at least in part on each of the one or more received power measurements being below a threshold power measurement.

4. The method of claim 2, wherein generating the resource availability report comprises:
generating the resource availability report based at least in part on a sum of each of the one or more received power measurements being below a threshold power measurement.

5. The method of claim 2, wherein generating the resource availability report comprises:
generating the resource availability report based at least in part on a mean of each of the one or more received power measurements being below a threshold power measurement.

6. The method of claim 1, wherein generating the resource availability report comprises:
measuring a demodulation reference signal associated with each of the plurality of sub-slots within the at least one slot to obtain one or more received power measurements; and
generating, in response to the inter-UE coordination request, the resource availability report indicating the at least one slot that is available based at least in part on a lowest received power measurement of the one or more received power measurements.

7. The method of claim 1, wherein generating the resource availability report comprises:
measuring a demodulation reference signal associated with each of the plurality of sub-slots within the at least one slot to obtain one or more received power measurements; and
generating, in response to the inter-UE coordination request, the resource availability report indicating the at least one slot that is available based at least in part on a highest received power measurement of the one or more received power measurements.

8. The method of claim 1, wherein the plurality of sub-slots within the at least one slot comprise a first sub-slot that begins at a start time of the at least one slot and a second sub-slot adjacent to the first sub-slot in a time domain.

9. The method of claim 1, further comprising:
receiving a sidelink control transmission, wherein the one or more measurements comprise one or more received power measurements associated with the sidelink control transmission.

10. The method of claim 1, wherein receiving the inter-UE coordination request comprises:
receiving, from the second UE, an inter-UE coordination request that requests a resource availability report associated with one or more sub-slots from the first UE.

11. The method of claim 1, wherein the inter-UE coordination request indicates a quantity of slots associated with the resource availability report.

12. The method of claim 1, wherein the inter-UE coordination request indicates a priority associated with each of the plurality of sub-slots.

13. A method for wireless communication at a second user equipment (UE), comprising:
transmitting, to a first UE, an inter-UE coordination request that requests a resource availability report from the first UE; and
receiving, in response to the inter-UE coordination request, an inter-UE coordination message that indicates the resource availability report indicating at least one slot that is available based at least in part on one or more measurements of one or more sub-slots of a plurality of sub-slots within the at least one slot.

14. The method of claim 13, wherein the one or more measurements comprise one or more received power measurements associated with each of the plurality of sub-slots within the at least one slot.

15. The method of claim 14, wherein receiving the inter-UE coordination message comprises:
receiving the inter-UE coordination message that indicates the resource availability report based at least in part on each of the one or more received power measurements being below a threshold power measurement.

16. The method of claim 14, wherein receiving the inter-UE coordination message comprises:
receiving the inter-UE coordination message that indicates the resource availability report based at least in part on a sum of each of the one or more received power measurements being below a threshold power measurement.

17. The method of claim 14, wherein receiving the inter-UE coordination message comprises:
receiving the inter-UE coordination message that indicates the resource availability report based at least in part on a mean of each of the one or more received power measurements being below a threshold power measurement.

18. The method of claim 13, wherein the one or more measurements comprise one or more received power measurements, and receiving the inter-UE coordination message comprises:
receiving the inter-UE coordination message that indicates the resource availability report based at least in part on a lowest received power measurement of the one or more received power measurements.

19. The method of claim 13, wherein the one or more measurements comprise one or more received power measurements, and receiving the inter-UE coordination message comprises:
receiving the inter-UE coordination message that indicates the resource availability report based at least in part on a highest received power measurement of the one or more received power measurements.

20. The method of claim 13, wherein the plurality of sub-slots within the at least one slot comprise a first sub-slot that begins at a start time of the at least one slot and a second sub-slot adjacent to the first sub-slot in a time domain.

21. The method of claim 13, wherein the one or more measurements comprise one or more received power measurements associated with a sidelink control transmission.

22. The method of claim 13, wherein transmitting the inter-UE coordination request comprises:
transmitting, to the first UE, an inter-UE coordination request that requests a resource availability report associated with one or more sub-slots from the first UE.

23. The method of claim 13, wherein transmitting the inter-UE coordination request comprises:
transmitting, to the first UE, the inter-UE coordination request that requests the resource availability report from the first UE, the inter-UE coordination request indicating a quantity of slots associated with the resource availability report.

24. The method of claim 13, wherein transmitting the inter-UE coordination request comprises:
transmitting, to the first UE, the inter-UE coordination request that requests the resource availability report from the first UE, the inter-UE coordination request indicating a priority associated with each of the plurality of sub-slots within the at least one slot.

25. An apparatus for wireless communication at a first user equipment (UE), comprising:
a processor;
memory coupled with the processor; and
instructions stored in the memory and executable by the processor to cause the apparatus to:
receive, from a second UE, an inter-UE coordination request that requests a resource availability report from the first UE;
generating, in response to the inter-UE coordination request, the resource availability report indicate at least one slot that is available based at least in part on one or more measurements of one or more sub-slots of a plurality of sub-slots within the at least one slot; and
transmit, to the second UE in response to the inter-UE coordination request, an inter-UE coordination message that indicates the resource availability report.

26. The apparatus of claim 25, wherein the instructions are further executable by the processor to cause the apparatus to:
measure a demodulation reference signal associated with each of the plurality of sub-slots within the at least one slot to obtain one or more received power measurements, wherein the one or more measurements comprise the one or more received power measurements.

27. The apparatus of claim 26, wherein the instructions to generate the resource availability report are executable by the processor to cause the apparatus to:
generate the resource availability report based at least in part on each of the one or more received power measurements being below a threshold power measurement.

28. An apparatus for wireless communication at a second user equipment (UE), comprising:
a processor;
memory coupled with the processor; and
instructions stored in the memory and executable by the processor to cause the apparatus to:
transmit, to a first UE, an inter-UE coordination request that requests a resource availability report from the first UE; and
receive, in response to the inter-UE coordination request, an inter-UE coordination message that indicates the resource availability report indicating at least one slot that is available based at least in part on one or more measurements of one or more sub-slots of a plurality of sub-slots within the at least one slot.

29. The apparatus of claim 28, wherein the one or more measurements comprise one or more received power measurements associated with each of the plurality of sub-slots within the at least one slot.

30. The apparatus of claim 29, wherein the instructions to receive the inter-UE coordination message are executable by the processor to cause the apparatus to:
receive the inter-UE coordination message that indicates the resource availability report based at least in part on each of the one or more received power measurements being below a threshold power measurement.

* * * * *